(12) United States Patent
Kuhns et al.

(10) Patent No.: US 8,721,254 B1
(45) Date of Patent: May 13, 2014

(54) METHOD FOR STACKING BEAMS

(75) Inventors: Leroy M. Kuhns, Millersburg, OH (US);
Martin E. Kuhns, Millersburg, OH (US); Kevin Scott Mullet, Shreve, OH (US)

(73) Assignee: Mill Innovations & Design, LLC, Millersburg, OH (US)

( * ) Notice: Subject to any disclaimer, the term of this patent is extended or adjusted under 35 U.S.C. 154(b) by 209 days.

(21) Appl. No.: 13/531,451

(22) Filed: Jun. 22, 2012

(51) Int. Cl.
*B21B 39/00* (2006.01)
*B22D 11/12* (2006.01)
*B22D 5/00* (2006.01)
*B65G 57/00* (2006.01)
*B65G 57/28* (2006.01)

(52) U.S. Cl.
USPC ............... 414/802; 414/789.2; 414/789.8

(58) Field of Classification Search
USPC ............... 193/45, 47, 48; 198/394, 397.02, 198/397.03, 397.04, 409, 413, 431, 783; 271/214; 414/421, 567, 754, 758, 769, 414/778, 789.2, 789.8, 790, 791.1, 791.6, 414/792.6, 793.9, 798.5, 799, 900, 923, 414/802; 53/542, 543, 544; 83/155, 155.1, 83/157
See application file for complete search history.

(56) References Cited

U.S. PATENT DOCUMENTS

| | | |
|---|---|---|
| 2,066,971 A | 1/1937 | Gora |
| 2,113,926 A | 4/1938 | Pierce |
| 2,635,659 A | 4/1953 | Gerdine |
| 2,737,390 A | 3/1956 | Morgan et al. |
| 2,770,373 A | 11/1956 | Verrinder et al. |
| 2,897,949 A | 8/1959 | Huisking |
| 2,948,382 A | 8/1960 | Russell |
| 3,184,079 A | 5/1965 | Buccicone |
| 3,231,103 A | 1/1966 | Tantilinger |
| 3,432,983 A | 3/1969 | Picollo |
| 3,656,743 A | 4/1972 | Ruud |
| 3,667,076 A | 6/1972 | Aglaghanian et al. |
| 3,764,024 A | 10/1973 | Mojden |
| 3,802,347 A | 4/1974 | Rymes |
| 3,869,036 A | 3/1975 | Peters et al. |
| 3,880,296 A | 4/1975 | Kaplan |
| 4,034,846 A | 7/1977 | Burgis et al. |
| 4,253,787 A | 3/1981 | Lunden et al. |
| 4,367,999 A | 1/1983 | Benuzzi |
| 4,679,379 A | 7/1987 | Cassoli |
| 4,692,876 A | 9/1987 | Tenma et al. |
| 4,765,487 A | 8/1988 | Bliss |
| 4,846,923 A | 7/1989 | Lines |
| 5,027,700 A | 7/1991 | Tschesche |
| 5,243,901 A | 9/1993 | Green |
| 5,364,147 A | 11/1994 | Dickey et al. |
| 5,426,921 A | 6/1995 | Beckmann |
| 5,481,848 A | 1/1996 | Tagliaferri et al. |
| 5,656,005 A | 8/1997 | Cummings et al. |

(Continued)

Primary Examiner — Gregory Adams
(74) Attorney, Agent, or Firm — Buskop Law Group, PC; Wendy Buskop

(57) ABSTRACT

A computer implemented method for automatically stacking beams from a continuously moving live deck, wherein the method involves sequentially receiving a plurality of beams onto a stacking fork assembly, pivoting the stacking fork assembly from a receiving position to a stacking position forming a tier of beams, placing the tier on a pair of bidirectional moving members, moving the tier away from the stacking fork assembly, rotating the stacking fork assembly back to the receiving position to sequentially receive another plurality of beams, pivoting the plurality of beams forming a second tier, moving the first tier back to contact the second tier, moving the contacted first and second tier away from the stacking fork assembly enabling a third or fourth tier to be formed and contact the first and second tiers, forming a bundle.

18 Claims, 22 Drawing Sheets

(56) References Cited

U.S. PATENT DOCUMENTS

| | | |
|---|---|---|
| 5,716,184 A | 2/1998 | Lowe et al. |
| 5,911,553 A | 6/1999 | Pickering et al. |
| 6,067,773 A | 5/2000 | Le |
| 6,146,084 A | 11/2000 | Doyle |
| 6,435,352 B1 | 8/2002 | Schoenbeck et al. |
| 6,695,570 B2 | 2/2004 | Ford et al. |
| 7,195,299 B2 | 3/2007 | Steffens et al. |
| 7,648,322 B2 | 1/2010 | Moncrief et al. |
| 7,780,396 B2 | 8/2010 | Hendricks et al. |
| 7,811,854 B2 | 10/2010 | Gabara |
| 7,974,731 B2 | 7/2011 | Sander |
| 8,071,909 B2 | 12/2011 | Yamazaki et al. |
| 2003/0118430 A1 | 6/2003 | Braaten et al. |
| 2011/0030311 A1 | 2/2011 | Martin |

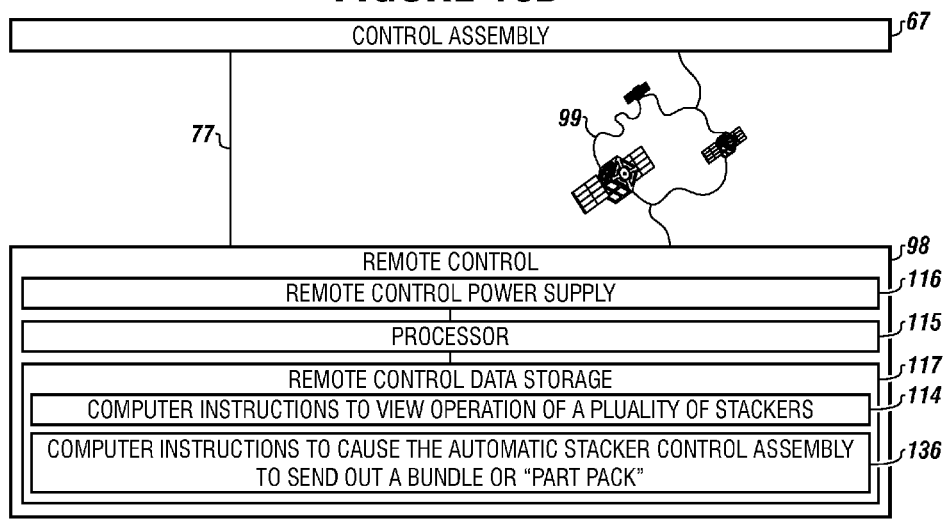

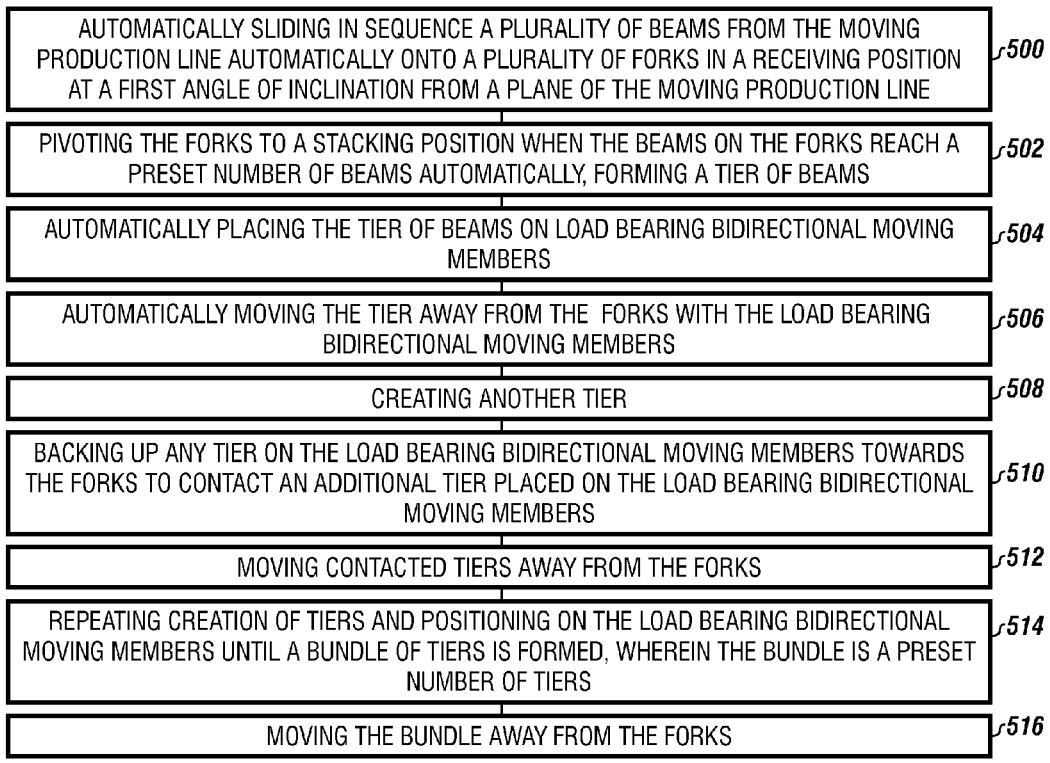

METHOD FOR STACKING BEAMS

FIELD

The present embodiments generally relate to an automated computer implemented method for stacking beams or cut timber from a live continuous feed line.

BACKGROUND

A need exists for an automated computer implemented method for stacking heavy lumber, heavy steel beams, or long boxes that is fast, easy to use, and requires no training.

A need exists for an automated computer implemented method for stacking that has high reliability for continuous use.

A need exists for a computer implemented method for stacking heavy longitudinal objects that provides greater levels of safety for workers in factories such as saw mills and steel plants to prevent accidents which otherwise cause loss of a finger, broken bones hurt backs, and even loss of both legs.

A need exists for a method to stack timbers and pipe that uses less energy than current processes and can easily be used with wind power, solar power, or other renewable energy resources.

The present embodiments meet these needs.

BRIEF DESCRIPTION OF THE DRAWINGS

The detailed description will be better understood in conjunction with the accompanying drawings as follows:

FIG. 21 depicts the sequence of steps of the method.

Figure 1:
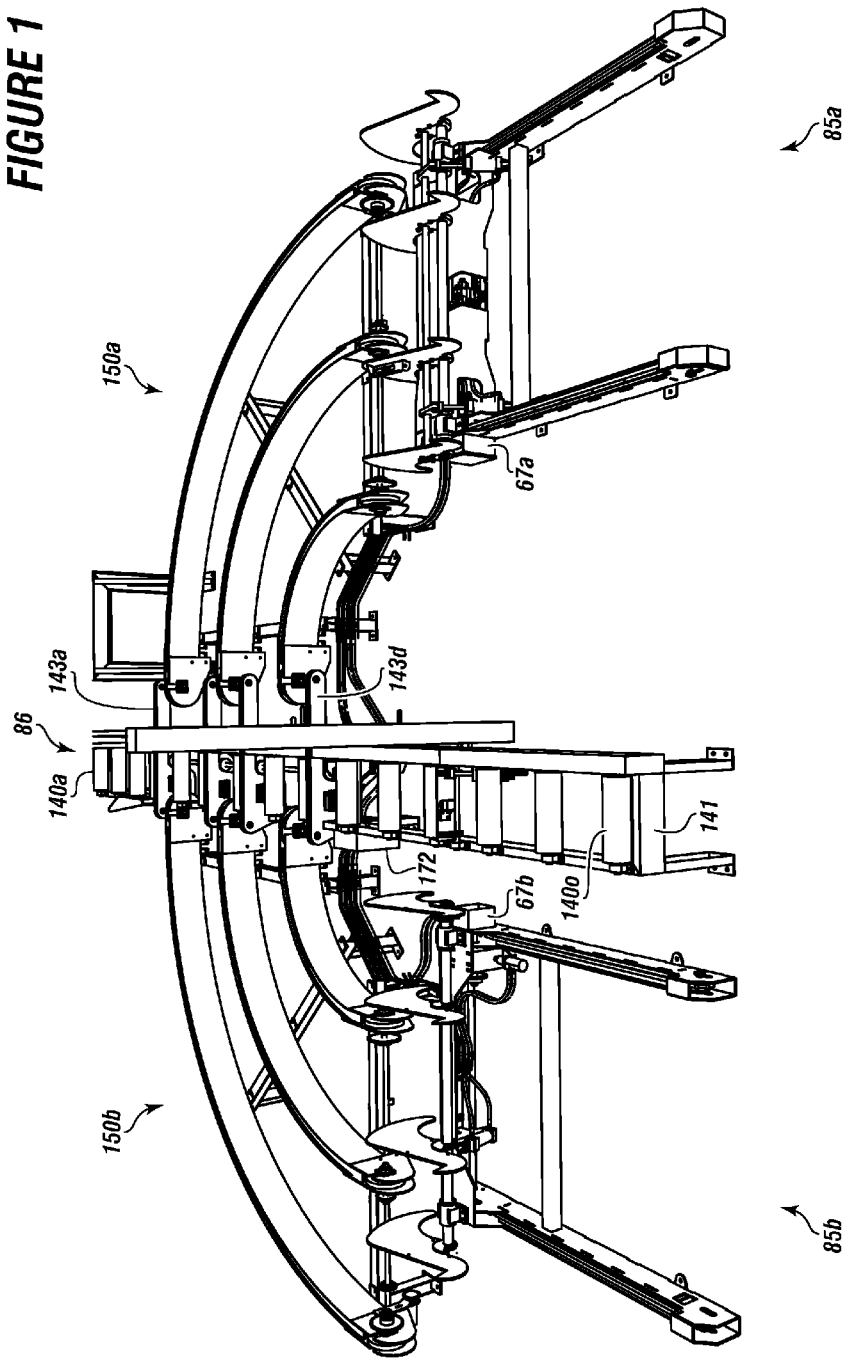
FIG. 1 depicts two different embodiments of a stacker connected to a ninety degree live deck and a roll case, for implementation of this method in a saw mill with the forks in in a "ready to receive beams" position, which is the first position according to the first step of the computer implemented method.

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The embodiments relate to a computer implemented method for stacking heavy timbers that can use power from a diesel generator, an electric grid, wind power or hydraulic power.

The automated method for stacking can be used in a saw mill to automatically stack cut timber without human intervention.

The method can be used to stack 500 railroad ties in 1 hour automatically.

The method provides a benefit of stacking four cut timbers automatically into a tier on a moving surface and building a bundle of tiers equivalent to twenty-four railroad ties for loading or storage without any need for human intervention.

The method for stacking automatically saves time in creating bundles of usable cut timber.

The method can be used in an oil field fabrication shop to automatically stack, without human intervention steel beams for use in building derricks or similar devices.

The method can be used in a variety of environments to stack large packages for shipping, such as irrigation systems which are prepackaged in large long boxes.

In an embodiment, the method can be a remote controlled method enabling an operator wired to the control assembly of a stacker to safely stack large loads of cut timber in a room apart, safely away from the moving equipment which can break bones, and crush feet.

In an embodiment, the method can be implemented using a remote control via a network from a control room.

In one or more embodiments, the method can include monitoring and operating multiple stacker equipment simultaneously, from a remote location over a network using an executive dashboard to indicate operational status, counts of beams loaded, and problems with connected machines.

In an embodiment, the computer implemented method can include sliding in sequence a plurality of beams from the moving production line to an automatic stacker, wherein the beams slide sequentially and automatically onto a plurality of forks at a first angle of inclination from a plane of the moving production line.

The method can also include stopping a first beam of the sequence using a plurality of accumulation stops on the forks, wherein one accumulation stop is formed on each fork.

The method can also include allowing the first beam to stop a second beam, and allowing the second beam to stop a third beam, until a preset number of beams reside at a right angle across the forks.

The method can further include sensing when the beams on the forks reach a preset number of beams.

The method can further include actuating computer instructions to pivot the forks of the automatic stacker from a receive position to a stacking position when the preset number of beams is sensed.

The method can also include forming a first tier of beams while pivoting the forks and placing the first tier on load bearing bidirectional moving members while actuating a stacking position sensor.

The method can also include using computer instructions to count tiers placed on the plurality of load bearing bidirectional moving members and save the count in data storage of a control system of the automatic stacker.

The method can include using computer instructions to move the load bearing bidirectional moving members carrying the first tier to a predetermined first distance away from the forks when the stacking position sensor is activated and the first tier is within a calibrated distance from a full tier sensor.

The method can include sensing when the full tier sensor deactivates and then using computer instructions to pivot the forks back to the receive position.

The method can then include deactivating hydraulic components for pivoting when the forks are in the receive position.

The above steps can be repeated to form a second tire of beams. Then the method can include placing the second tier on the load bearing bidirectional moving members proximate to the first tier while actuating the stacking position sensor and using computer instructions to count tiers placed on the plurality of load bearing bidirectional moving members and saving the count in data storage of a control system of the automatic stacker.

The method can include using computer instructions to actuate the hydraulic components to move the load bearing bidirectional moving members towards the forks to a predetermined second distance when a sum of counted tiers exceeds one, to contact the first tier with the second tier.

The method can then include moving the load bearing bidirectional moving members in a direction away from the forks carrying the first and second tier to a predetermined third distance while the first and second tier remains in contact.

In embodiments, the computer implemented method can include controlling the computer implemented stacking method from a remote location using a programmable controller connected to a network.

In embodiments, the computer implemented method can include computer instructions to count numbers of tiers and comparing the counted number of tiers to a predetermined quantity of tiers, and when the predetermined quantity of tiers is reached, using the computer instructions to move the load bearing bidirectional moving members with the predetermined quantity of tiers to a predetermined fourth distance away from the forks.

In embodiments, the computer implemented method can include controlling longitudinal movement of the forks using a plurality of collars.

In embodiments, the computer implemented method can include using load bearing bidirectional moving members to support and move a load up to 10 tons.

In embodiments, the computer implemented method can include using a plurality of fork mounts affixed to the forks enabling the forks to be removable.

In embodiments, the computer implemented method can include using bearings to facilitate pivoting of the forks.

In embodiments, the computer implemented method can include mounting the forks to both a shaft and a tubular using fork mounts and rod mounts, wherein the tubular is mounted in parallel with the shaft.

In embodiments, the computer implemented method can include using a beam stop within each fork, wherein the beam stop forms a radius from a pivot point, and prevents beams from the moving production line from moving while the plurality of forks pivots.

In embodiments, the computer implemented method can include using a remote control for performing and monitoring steps of the computer implemented method over a network or a wire from a location remote to the stacker.

In embodiments, the computer implemented method can include stopping the movement of the load bearing bidirectional moving members when a predetermined quantity of tiers is detected.

In embodiments, the computer implemented method can include stopping the movement of the stacker when a predetermined quantity of tiers is detected.

In embodiments, the computer implemented method can include moving the load bearing bidirectional moving members using a drive assembly.

In embodiments, the computer implemented method can include calibrating the full tier sensor to produce a signal when one of the full tiers is within a predetermined sensor range of the sensor and to deactivate the signal when the full tiers are outside the predetermined sensor range.

In embodiments, the computer implemented method can include using hydraulic components that control the speed of the hydraulic fluid flow to the drive assembly using automatic flow controllers.

In embodiments, the computer implemented method can include using a ninety degree live deck to feed beams as a first step to the computer implemented method for computer implemented stacking, wherein the ninety degree live deck is automatically controlled using the computer implemented method for stacking.

With the need to conserve energy usage, this uniquely automated method will save significant energy costs in saw mills and other manufacturing and material handling facilities.

For the purpose of this application, the word "beam" can refer to cut timbers, such as railroad ties; boat timbers; building timbers; heavy metal tubulars, such as pipe; long irrigation piping; lightweight very long objects, such as Styrofoam 12 foot rectangular objects; long heavy rectangular boxes, such as a box containing multiple steel rods; H-beams; I-beams made from steel; channel steel; box tubing; and rectangular or elliptical steel shaped objects that have a length longer than their width. The term beam can also include long polymer, concrete, or ferrous blocks, such as parking lot stops, and stackable speed bumps, pieces for horse gates, and car parts.

As used herein the term "moving production line" can refer to a line, which can continuously receive components from a source in a factory or a saw mill, and then produce these components to the stacker at regular intervals, such as continuously every 3 minutes. This term "moving production line" also refers to a production line which may provide components in batches, enabling the automatic stacker to continuously stack components at 1 minute intervals automatically for 15 minutes, and then idle for a specified period of time. This term "moving production line" also can continuously run, 24 hours a day, 7 days a week, allowing the automatic stacker to stack at 1 to 3 minute intervals, as large products are produced to the automatic stacker.

The term "load bearing bidirectional moving members" as used herein can refer to moving members, which can be chain and steel combinations that has the flexibility to carry at least 10 pounds and up to 10 tons of stacked beams without deforming, without torqueing, without producing excessive friction, heat and wear. The term "load bearing" refers to the ability to transport or move including pivoting, both light and extremely heavy objects, such as 16 railroad ties without deforming, heating up, torqueing, bending or otherwise distorting or failing.

The term "fork" as used herein can refer to 2 to 10 forks which can be plates of steel. The forks are formed to each have an accumulating edge and an accumulation stop. The forks are mounted to a shaft so that the accumulating edges are in parallel with each other, all accumulating edges facing in the same direction, for engaging and supporting beams from a moving production line. The forks simultaneously and synchronously operated when pivoted by the shaft, all moving identically and at the same time.

The term "receive position" as used herein can refer to the position of the stacking fork assembly, so that a beam can slide over the accumulating edges of each of the plurality of forks simultaneously, using gravity such as at a right angle to a longitudinal axis of the beam until a first beam touches the accumulation stop, a second beam touches the first beam, a third beam touches the second beam and so on until a user specified number of beams are received by the stacking fork assembly.

The term "stacking position" as used herein can refer to the position of the stacking fork assembly, wherein the plurality of beams lying at a right angle across the accumulating edges of each of the plurality of forks, simultaneously, forms a tier of beams that stands without any need of additional support on the load bearing bidirectional moving members simultaneously. In this definition, the stacking position has the tier positioned wherein the longitudinal orientation of the tier is generally at a right angle to the forward and reverse directions that the load bearing bidirectional moving members move.

The term "idler sprocket" as used herein can refer to a sprocket disposed over the retaining pin and is a component of the chain tightener assembly which sits idle and inactive unless turned by one of the load bearing bidirectional moving members.

Turning now to the Figures, the automatic stacker is shown in FIG. 1 having two different embodiments, such as automatic stackers 85a and 85b for receiving beams which can be cut timber from a moving production line.

The automatic stackers 85a and 85b are shown each hydraulically and electronically connected to a unique live deck which is referred to herein as "ninety degree live decks" 150a and 150b. The ninety degree live decks 150a and 150b feed beams to the automatic stackers 85a and 85b.

Also shown in FIG. 1, is a live roll case 86. The live roll case can have pull off chains. The live roll case can have a live roll case control assembly 172 that controls the feeding of beams from a manufacturing area, such as the sawing area of a saw mill to either the connected ninety degree live deck 150a or the ninety degree live deck 150b, which changes depending on computer instructions from control assemblies 67a and 67b, of the stackers to the live roll case control assembly 172.

Although the stackers will be described in additional figures, it should be noted that the stackers can control the live roll case 86 operation. The live roll case has a plurality of rollers 140a-140o in a frame 141.

In this embodiment, the plurality of rollers 140a-140o can be driven by a roller chain (not shown) which is further driven by a hydraulic motor (not shown), causing beams such as cut timber which can be very large, very heavy, very dangerous rail ties, to move across some of the plurality of rollers 140a-140o in a first longitudinal direction on the frame 141.

In this embodiment, a plurality of pull off chains 143a-143d can be parts of the roll case and can be activated and deactivated by the automatic stacker to control feed of beams to the automatic stacker.

The pull off chains simultaneously move the beams such as railroad ties from a position longitudinally over the frame of the live roll case 86 enabling the beams to rest on moving chains of the ninety degree live deck, automatically moving to either the left hand ninety degree live deck or to the right hand ninety degree live deck, depending on signals from the control assemblies 67a and 67b.

The control assemblies use computer instructions to control the control assembly of the live roll case to indicate when to turn on and move beams or to turn off. The live roll case can stand by when the automatic stacker is not ready to receive beams for stacking.

The live roll case can only operate the moving pull off chains when the automatic stackers can receive beams, and otherwise the live roll case stays safely in an off or idle position, not using any significant energy, only using enough energy to receive the computer signals, without using energy to move the motors that operate the chains.

Figure 2:
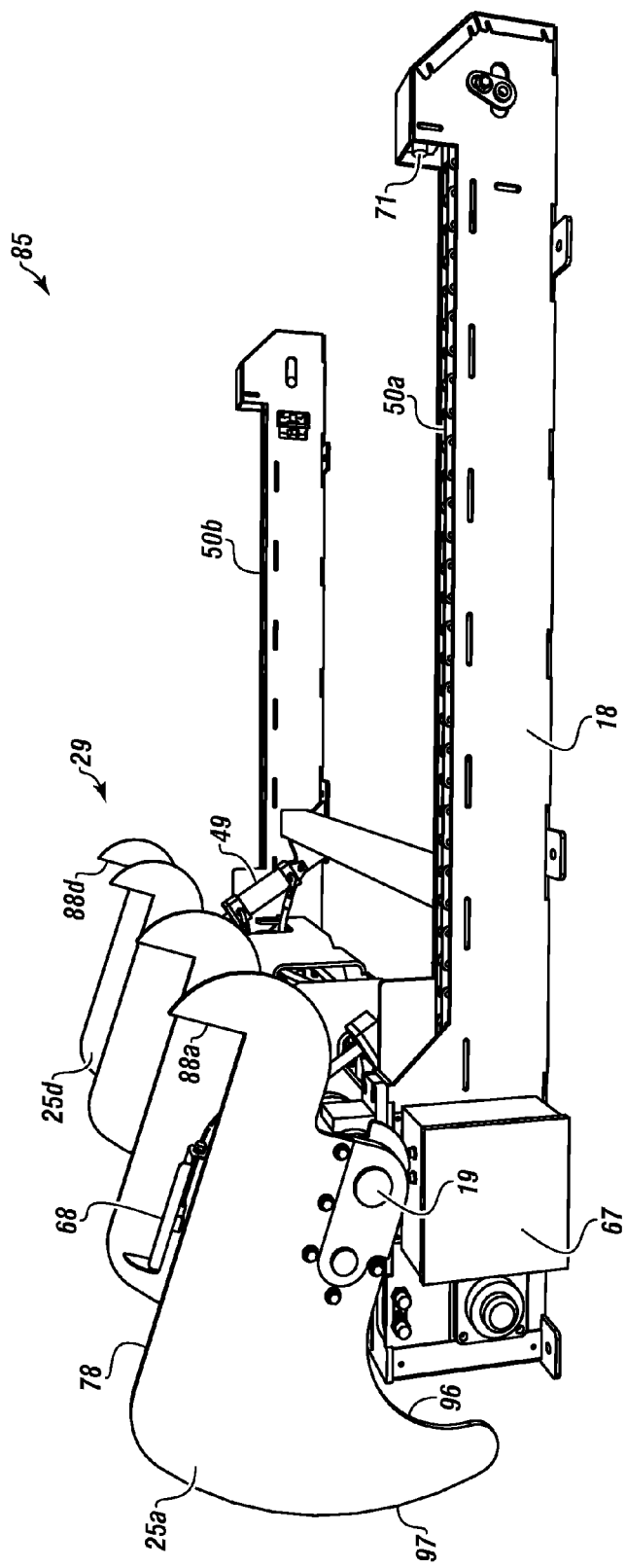
FIG. 2 depicts a side perspective view of an embodiment of a stacker usable with this method.

FIG. 2 depicts a side perspective view of an embodiment of the automatic stacker 85.

FIG. 2 further shows a stacking fork assembly 29 secured to a main frame weldment 18.

The stacking fork assembly 29 has a plurality of forks 25a-25d mounted in parallel. Each fork being formed from uniquely shaped plates of steel which can be burned out A-36 steel plates with a ½ inch thickness.

Each fork can have an accumulation stop 88a-88d. Fork 25a is shown with accumulation stop 88a, fork 25b is shown with accumulation stop 88b, fork 25c is shown with accumulation stop 88c, and fork 25d is shown with accumulation stop 88d.

A shaft 19 engages the plurality of forks 25a-25d simultaneously, allowing synchronous movement of the forks, namely synchronous pivoting.

The shaft 19 can be driven by a hydraulic cylinder 49. The shaft 19 can be pivoted by the hydraulic cylinders.

The shaft pivots the plurality of forks 25a-25d simultaneously between a receive position and a stacking position. The forks in this embodiment of FIG. 2 are displayed rotated in a receive position.

In one or more embodiments, each fork can have a beam stop 97, a clearance curve 96 and an accumulator edge 78 forming a three sided fork.

The accumulator edge 78 is the portion of the fork onto which the beams slide in succession to then form a tier of stacked beams which is then placed at a right angle onto the pair of load bearing bidirectional moving members 50a and 50b simultaneously.

In one or more embodiments, a plane of the moving production line, such as the live deck of the ninety degree live deck can be located at a first angle of inclination. The first angle of inclination can allow gravity to move beams from the ninety degree live deck or from the moving production line onto the plurality of forks. The angle of inclination can be from about 1 degree to about 20 degrees.

The stacking fork assembly 29 can move from a receiving position to a vertical stacking position.

An end of strand weldment sensor 71 can connect to the control assembly 67 to provide a signal to the control assembly 67 when a beam is detected.

A full tier sensor 68 is mounted to one of the stacking fork assembly 29. The full tier sensor 68 can send a signal to one or more components of the automatic stacker 85. The full tier sensor 68 can be in communication with the control assembly 67. The control assembly 67 can instruct the hydraulic cylinder 49 to rotate the stacking fork assembly 29 to unload the stacking fork assembly 29.

Figure 3:
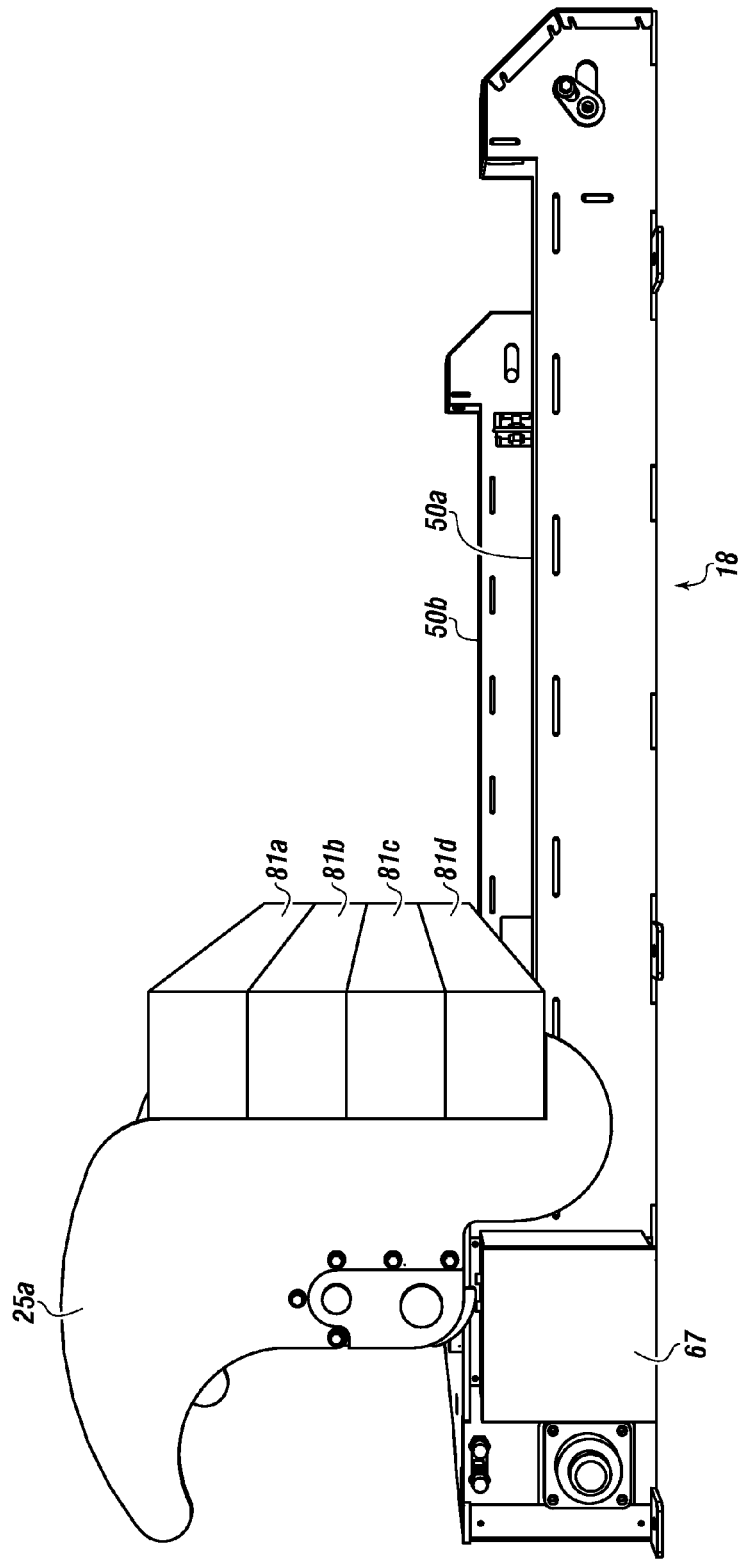
FIG. 3 depicts the step wherein a tiers are in the stacking position according to the computer implemented method.

FIG. 3 depicts a side perspective view of the automatic stacker in a stacking position.

A plurality of beams 81a, 81b, 81c, and 81d can form a tier of beams. The depicted tier is a tier of railroad ties held by the plurality of forks, in which fork 25a is labeled.

The tier is resting across both load bearing bidirectional moving members 50a and 50b contained within the main frame weldment 18.

The control assembly 67 can be mounted to the main frame weldment 18.

The plurality of forks are presented in this embodiment in the "stacking position" which is different from the "receive position" shown in FIG. 2.

The plurality of forks rotate clockwise from receive position to stacking position and then counterclockwise back to the "receive" position using the control assembly 67 and its associated parts and computer instructions.

Figure 4:
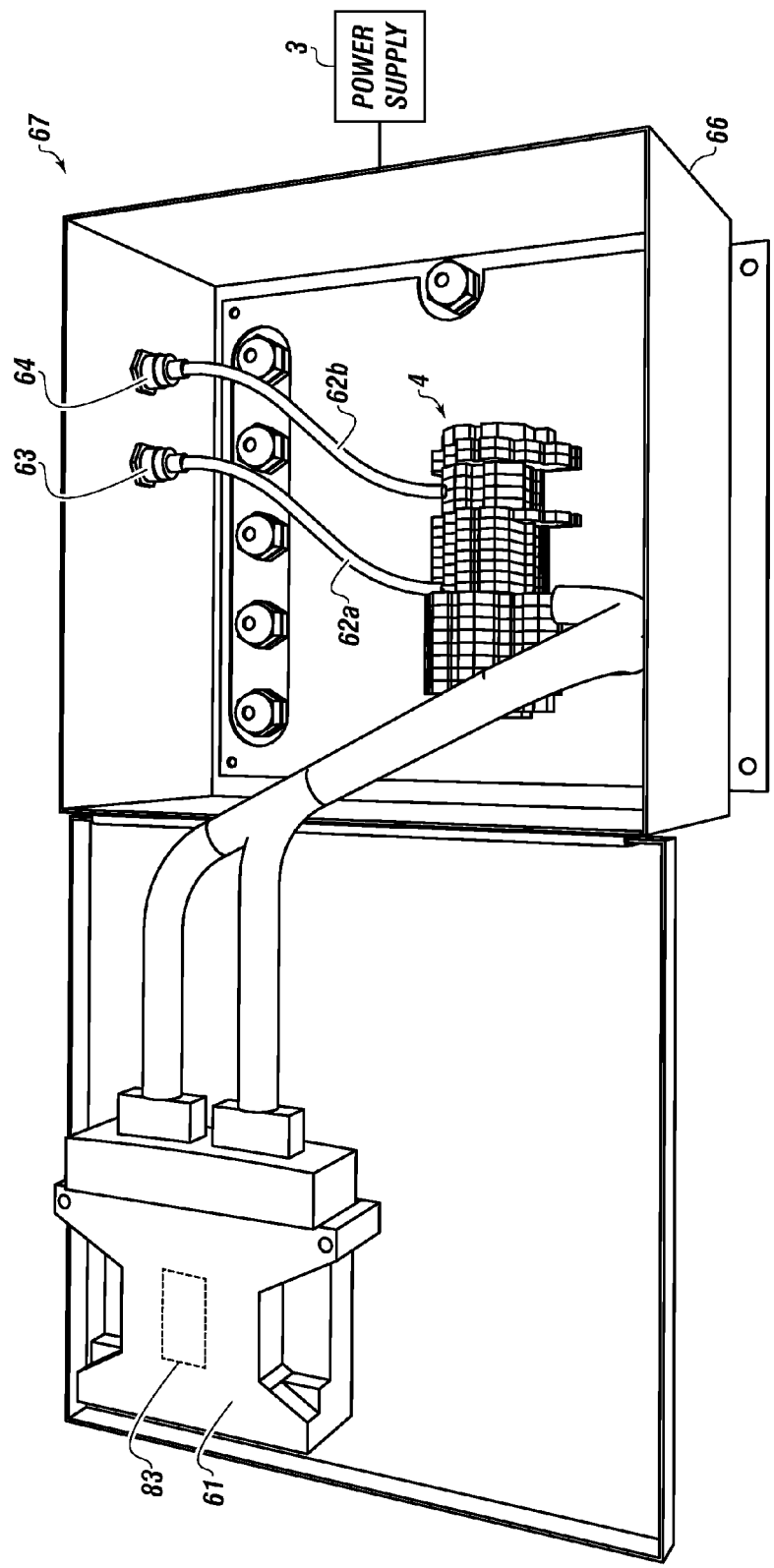
FIG. 4 is view of the control assembly usable in the computer implemented method.

FIG. 4 depicts internals of the housing 66 of the control assembly 67.

Figure 13A:
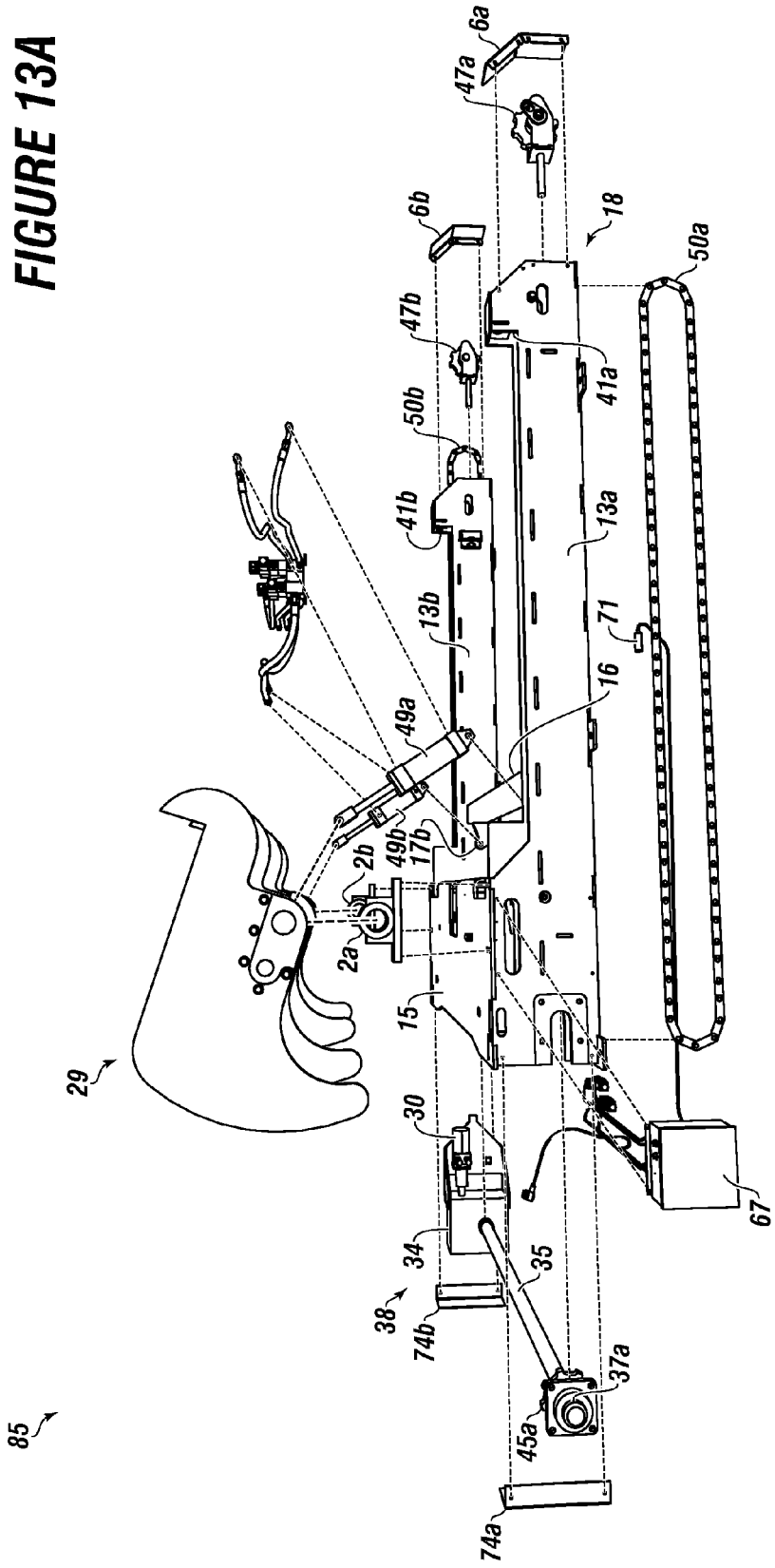
FIG. 13 depicts an exploded view of a stacker usable with this method.

The control assembly 67 can communicate with various other components including but not limited to: (i) a power supply 3, (ii) controllable hydraulic components, which are shown in FIG. 13, (iii) the drive assembly, which are also shown in FIG. 13, and (iv) load bearing bidirectional moving members.

The control assembly 67 can have a housing 66. The housing 66 can be any enclosure. The enclosure can be a hinged steel box. The housing 66 can contain a programmable controller 61.

The programmable controller 61 can be a programmable logic controller, or another small computer. The programmable controller 61 can be in communication with a stacking position sensor 63 mounted to the housing or proximate to the housing for sensing when the stacking fork assembly is in a stacking position.

Additionally the control assembly can include a receiving position sensor 64 in communication with the programmable controller 61 for sensing when the stacking fork assembly is in a receiving position for accepting, sequentially a predetermined number of beams, which in embodiments can be cut timber, or long packing boxes.

The control assembly 67 can also include a data storage 83, which can be in communication with the programmable controller 61.

The housing 66 of the control assembly 67 in this embodiment depicts the programmable controller 61 in wired communication with the outputs to the various devices including the stacking position sensor 63 and the receiving position sensor 64 using wiring harnesses 62a and 62b.

A contact block 4 can be installed in the housing. The contact block 4 can be connected with the stacking position sensor 63 and the receiving position sensor 64 using wiring harnesses 62a and 62b. The contact block 4 can also be connected with the programmable controller 61.

It should be noted that the automatic stacker has a significant benefit of reducing a facility's exposure to workman compensation claims, as the automated device will reduce the costs and expense associated with back injuries experienced by workers when lifting heavy loads, such as railroad ties or long tubulars for offshore drilling rigs which improve the American Economy by lowering fuel costs.

Figure 5:
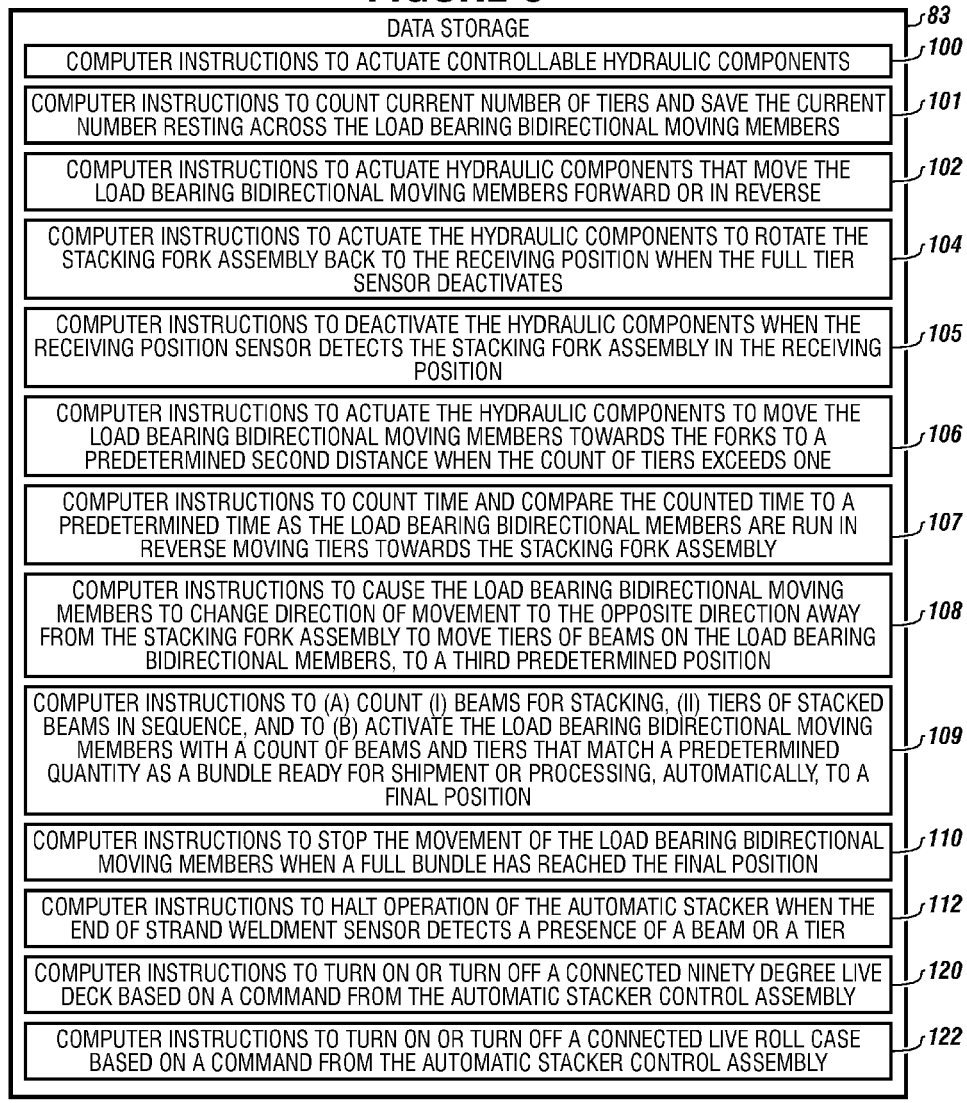
FIG. 5 a diagram of the data storage with computer instructions usable in this computer implemented method.

FIG. 5 depicts the data storage 83 containing computer instructions to actuate controllable hydraulic components 100. The computer instructions to actuate controllable hydraulic components 100 can be used to pivot the stacking fork assembly from the receiving position to the vertical stacking position and count a quantity of beams that are loaded on the forks as the beams load by gravity onto the accumulating edges of the parallel mounted forks simultaneously.

The data storage 83 can include computer instructions to actuate controllable hydraulic components 100 can count beams and compare the counted beams with preset quantities of beams in the data storage and then pivot the forks through a preset number of degrees when the detected quantity of beams equals the preset quantity of beams.

The data storage 83 can also contains computer instructions to count current number of tiers and save the current number resting across the load bearing bidirectional moving members 101.

The computer instructions to count current number of tiers and save the current number resting across the load bearing bidirectional moving members 101 can count the number of tiers of beams resting on the load bearing bidirectional moving members and save the acquired number of tiers of beams resting on the load bearing bidirectional moving members in the data storage.

The data storage 83 can include computer instructions to actuate hydraulic components that move the load bearing bidirectional moving members forward or in reverse 102.

Figure 6:
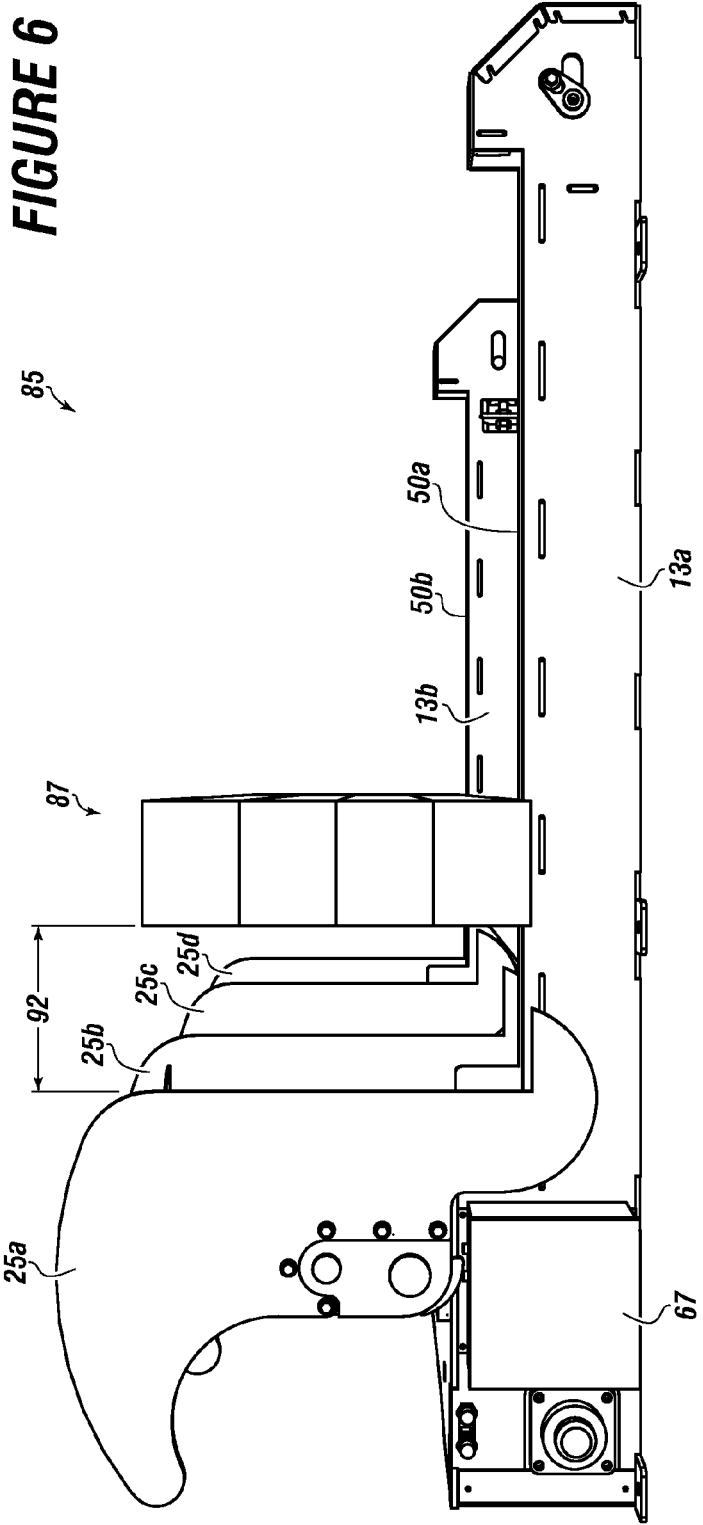
FIG. 6 depict a side perspective view of the forks in a stacking position by the tiers formed in a "clearance position" a predetermined first distance from the forks.

The computer instructions to actuate hydraulic components that move the load bearing bidirectional moving members forward or in reverse 102 can activate the hydraulic components to operate the load bearing bidirectional moving members in forward and reverse specifically while carrying a first tier to a predetermined first distance, shown in FIG. 6, away from the stacking fork assembly when both the full tier sensor in FIG. 2, and the stacking position sensor of FIG. 4, are simultaneously activated.

The data storage 83 can include computer instructions to actuate the hydraulic components to rotate the stacking fork assembly back to the receiving position when the full tier sensor deactivates 104.

The data storage 83 can include computer instructions to deactivate the hydraulic components when the receiving position sensor detects the stacking fork assembly in the receiving position 105.

The data storage 83 can include computer instructions to actuate the hydraulic components to move the load bearing bidirectional moving members towards the forks to a predetermined second distance when the count of tiers exceeds one 106.

The data storage 83 can include computer instructions to count time and compare the counted time to a predetermined time as the load bearing bidirectional members are run in reverse moving tiers towards the stacking fork assembly 107.

The data storage 83 can include computer instructions to cause the load bearing bidirectional moving members to change direction of movement to the opposite direction away from the stacking fork assembly to move tiers of beams on the load bearing bidirectional moving members, to a third predetermined position 108.

The data storage 83 can include computer instructions to (a) count (i) beams for stacking, (ii) tiers of stacked beams in sequence, and to (b) activate the load bearing bidirectional moving members with a count of beams and tiers that match a predetermined quantity as a bundle ready for shipment or processing, automatically, to a final position 109.

The data storage 83 can include computer instructions to stop the movement of the load bearing bidirectional moving members when a full bundle has reached the final position 110.

The data storage 83 can include computer instructions to halt operation of the automatic stacker when the end of strand weldment sensor detects a presence of a beam or a tier 112.

The data storage 83 can include computer instructions to turn on or turn off a connected ninety degree live deck based on a command from the automatic stacker control assembly 120.

The data storage 83 can include computer instructions to turn on or turn off a connected live roll case based on a command from the automatic stacker control assembly 122.

FIG. 6 depicts a side perspective view of the automatic stacker 85 with a first tier of beams 87 in a clearance position 92.

The plurality of forks 25a-25d are shown in a "stacking position". The first tier of beams 87 is shown in a "clearance position" since the first tier of beams 87 has been moved using the control assembly 67 with computer instructions to cause the load bearing bidirectional moving members 50a and 50b, contained within a first strand weldment 13a and a second strand weldment 13b to move the first tier of beams 87 to the clearance position 92. The clearance position 92 can be a first predetermined distance away from the plurality of forks 25a-25d.

Figure 7:
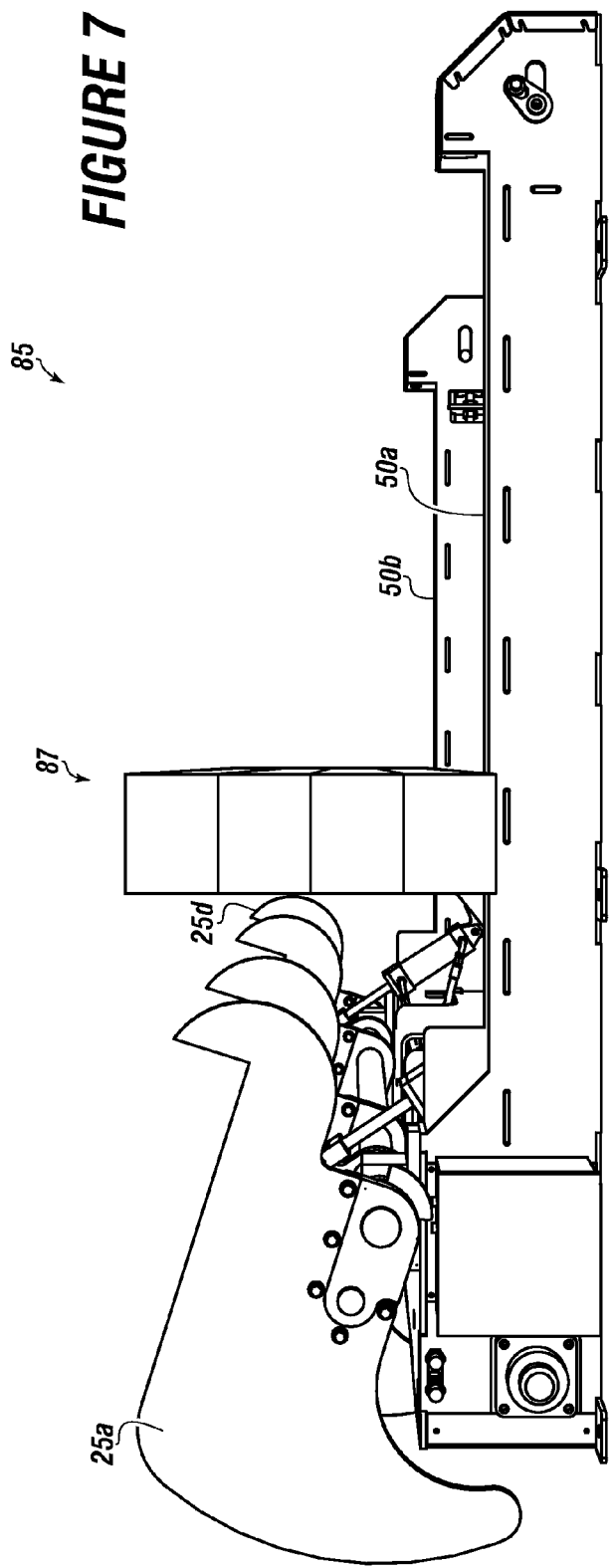
FIG. 7 depicts a step of the method in a side view of the stacker with the forks rotated back to a receive position for receipt of additional beams.

FIG. 7 depicts a side view of the automatic stacker 85 and a perspective view of the stacking fork assembly having the plurality of forks 25a-25d rotated to a receive position which is different from the stacking position.

The first tier of beams 87 can be at the clearance position when the plurality of forks 25a-25d are in a receiving position. The first tier of beams 87 can rest on the load bearing bidirectional moving members 50a and 50b.

Figure 8:
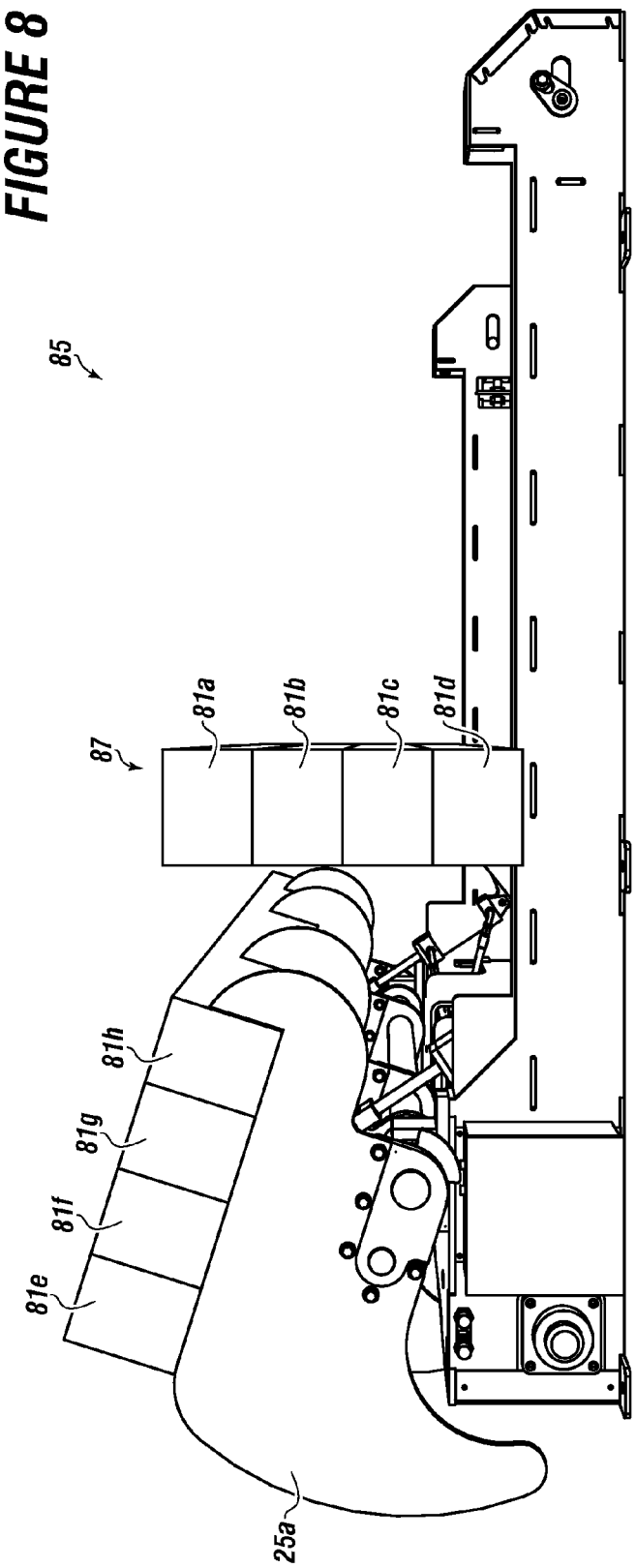
FIG. 8 depicts a step of the method showing a group of new beams positioned on the forks in the receiving position.

FIG. 8 depicts a side view of the automatic stacker 85 with the first tier of beams 87 made up of a plurality of beams 81a, 81b, 81c, and 81d stacked on top of each other.

The first tier of beams 87 is in a clearance position.

The plurality of forks 25a-25d are depicted supporting a predetermined amount of beams 81e, 81f, 81g, and 81h that upon pivoting the forks to a stacked position, will form a second tier of beams.

Figure 9:
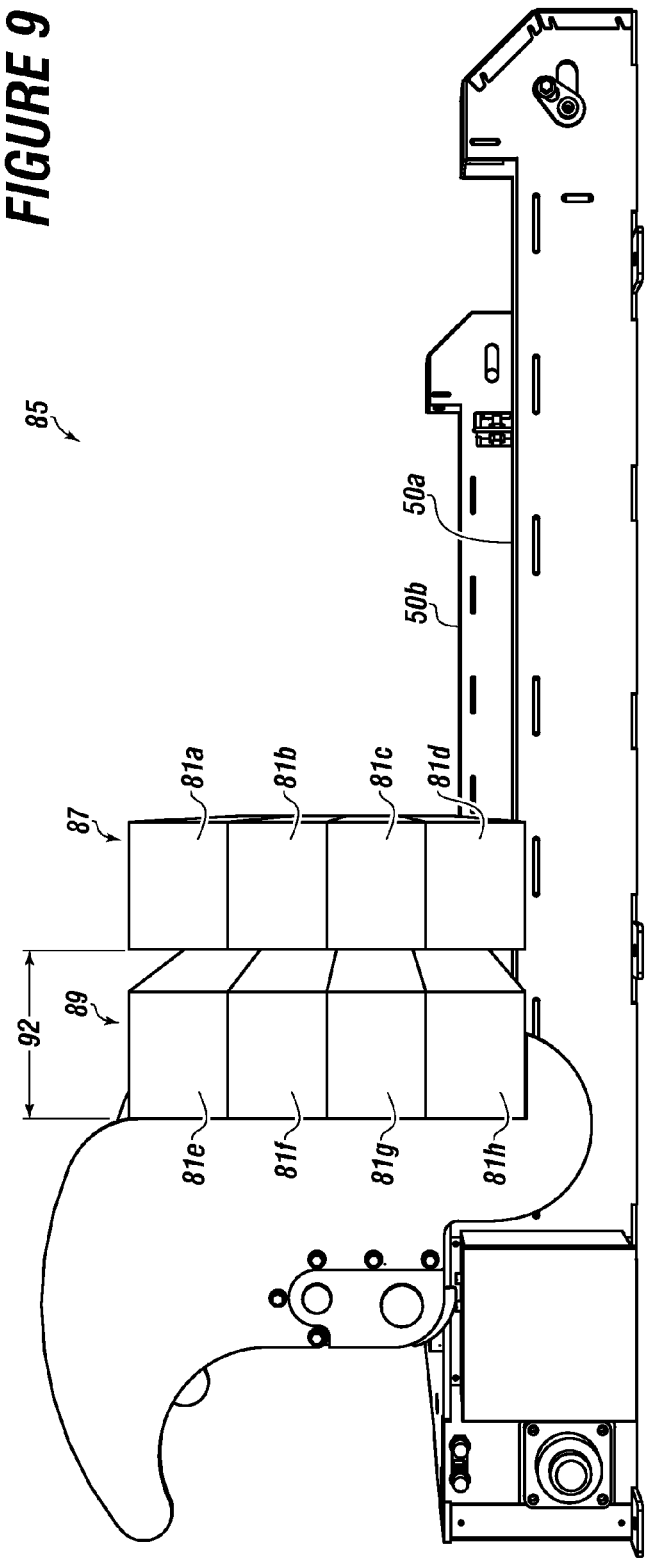
FIG. 9 is a side view depicting the step wherein the formed second tier of beams from the step shown in FIG. 8 with the forks rotated to the stacked position and the second tier is positioned on the load bearing bidirectional moving members of the stacker apart from the first tier of beams.

FIG. 9 is a side view of the automatic stacker 85 depicting a second tier of beams 89 on the load bearing bidirectional moving members 50a and 50b.

The second tier of beams 89 is still made up of a plurality of beams 81e, 81f, 81g, and 81h. The first tier of beams 87 is also shown with the plurality of beams 81a, 81b, 81c, and 81d.

The second tier of beams 89 is initially separated from the first tier of beams 87 on the load bearing bidirectional moving members 50a and 50b by a space which will vary depending on the size of the beams to be loaded. For railroad ties, the space can be a distance from about 1 inch to about 6 inches.

The first tier of beams 87 is shown at the clearance position 92 at a first predetermined distance away from the plurality of forks.

Figure 10:
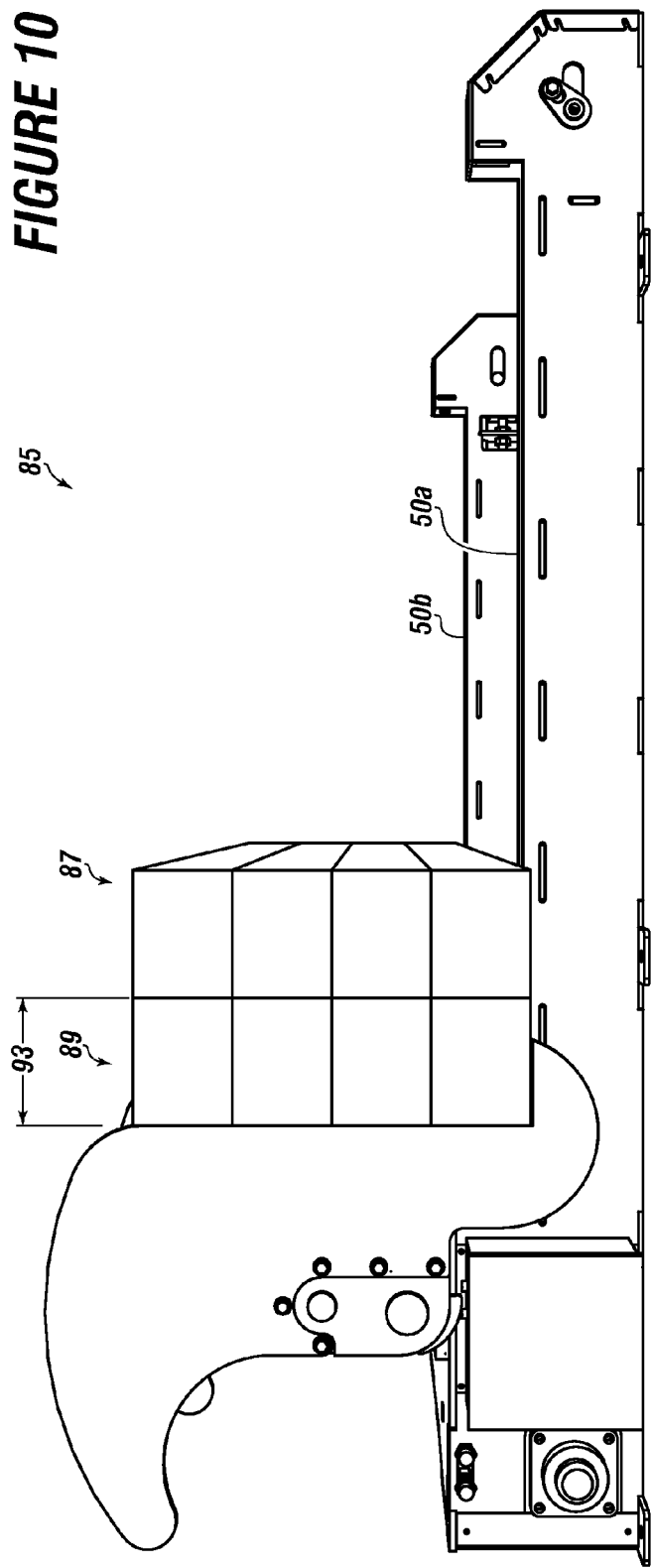
FIG. 10 is a side view of the step wherein the load bearing bidirectional moving members have moved towards the forks and positioned the first tier against the second tier.

FIG. 10 is a side view of the automatic stacker 85 after FIG. 9 activity, wherein the load bearing bidirectional moving members 50a and 50b have positioned the first tier of beams 87 against the second tier of beams 89 by moving the load bearing bidirectional moving members 50a and 50b towards the second tier of beams 89. The first tier of beams 87 are at and adjacent the clearance position 92.

Figure 11:
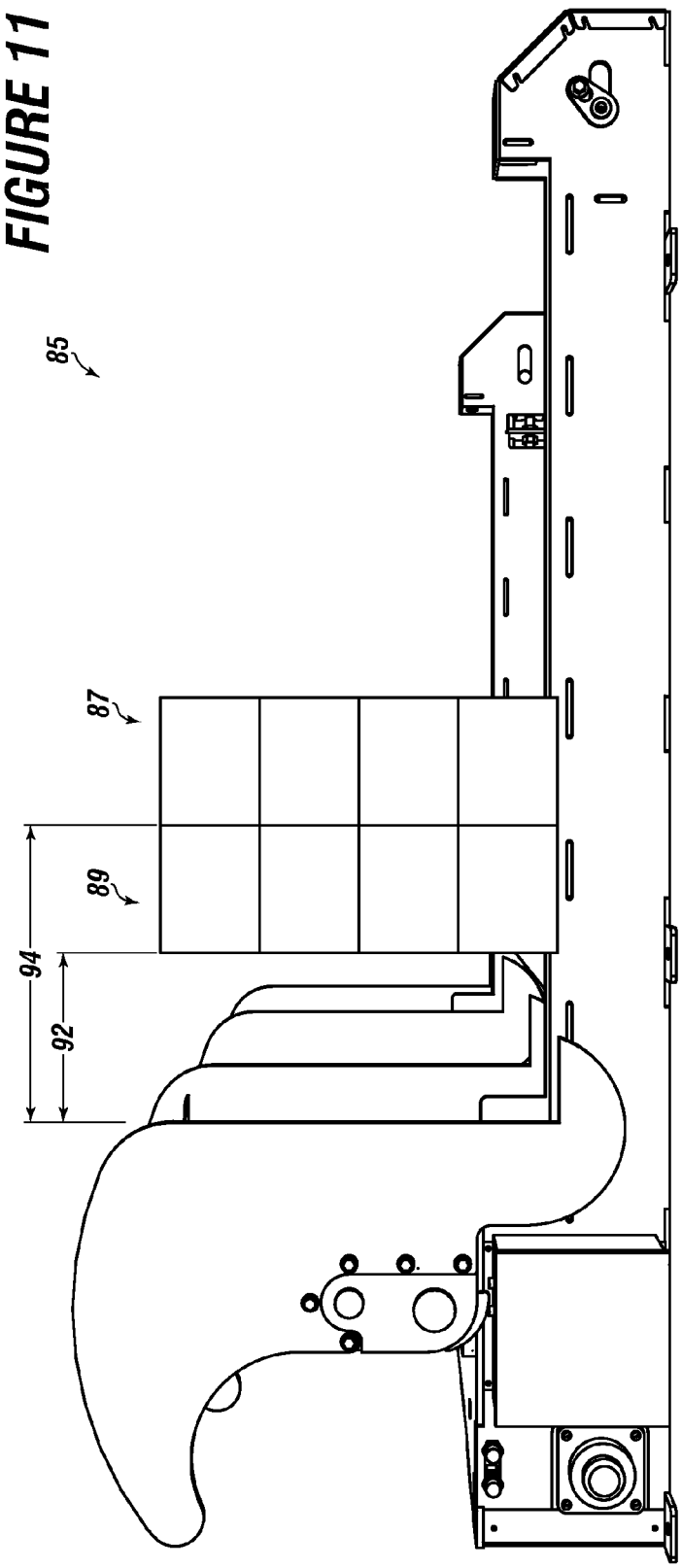
FIG. 11 depicts a side view of the step of stacking wherein the first and second tier have been both moved simultaneously away from the forks into a clearance position from the forks.

FIG. 11 depicts a side view of the automatic stacker 85 with the first tier of beams 87 and the second tier of beams 89 positioned away from the plurality of forks with the second tier of beams 89 at the clearance position 92. The first tier of beams 87 are at and adjacent the clearance position 94. The adjacent clearance position 94 can be at a third predetermined distance.

Figure 12:
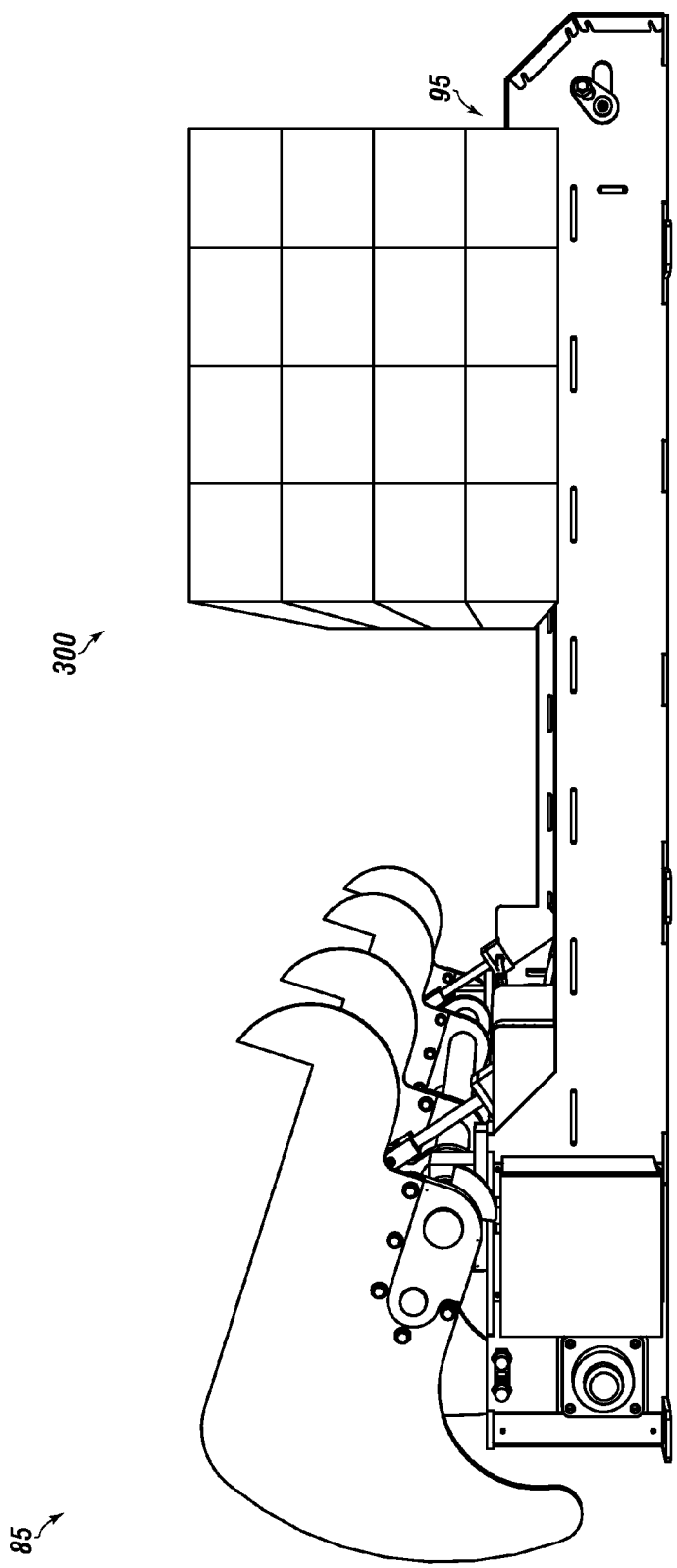
FIG. 12 depicts the step wherein tiers have been moved a predetermined distance from the forks and the forks rotated to a receiving position.

FIG. 12 shows the automatic stacker 85 with the predetermined quantity of tiers of stacked beams forming a bundle 300, positioned at a predetermined fourth distance 95 from the plurality of forks for loading or storage.

FIG. 13 depicts an exploded view of the automatic stacker 85.

The automatic stacker 85 has a main frame weldment 18 made up of a first strand weldment 13a and a second strand weldment 13b, wherein the first and second strand weldments are oriented in parallel with each other and extend from a back cross member 15 which is connected between one end of each strand weldment.

A front cross member 16 can connect between the first and second strand weldments 13a and 13b opposite the back cross member 15 at a point from about 25 percent to about 50 percent along the longitudinal length of each strand weldment, between the strand weldments.

The back cross member 15 can be a ½ inch steel burn out plate with dimensions such as 102 inches long by 16 inches in width. The front cross member 16 can be a 4 inch by 4 inch steel box tube 102 inches long.

Each strand weldment can have a projecting weldment stop 41a and 41b. Each strand weldment can have front guards 6a and 6b for eliminating pinch point and preventing broken bones, pinched skin, cutting off of fingers and feet and similar harms.

At least one of the projecting weldment stops 41a or 41b can support the end of strand weldment sensor 71 for causing tiers of stacked beams to stop when a tier bundle (shown in FIG. 12) approaches the projecting weldment stop. The end of the strand weldment sensor 71 provides an additional safety stop preventing harm in the facility.

Each strand weldment can be made from two sides. The first side and the second side can be oriented in parallel with each other and connected together, forming a connected beam to protect and support the load bearing bidirectional moving members 50a and 50b between the sides. Each strand weldment 13a and 13b can support one of the load bearing bidirectional moving members 50a or 50b.

Each side can also have a first portion with a first height to support the load bearing bidirectional moving members. Each side can have a weldment stop formed in an end of the first portion with a second height.

Opposite the weldment stop, another portion of each strand weldment has a third height supporting the back cross member 15 at a height greater than the first height of the strand weldments, allowing the beams to move from a horizontal sequentially held receiving position to a stacked tier position upon pivoting of the plurality of forks and using the hydraulic cylinder to move the forks downward along with gravity to reduce work on the hydraulic cylinder.

The beams move from a first height above the strand weldments to form a stacked tier when placed upon the load bearing bidirectional moving members in the strand weldments.

The forks drop lower than the load bearing bidirectional moving members, allowing easy deposition of the tiers on the load bearing bidirectional moving members.

The load bearing bidirectional moving members 50a and 50b can each include a chain. The chain can be driven by a drive assembly 38 connected to the main frame weldment 18. The load bearing bidirectional moving members can in an embodiment include chain that is 81X steel conveyor chain.

Each chain of each load bearing bidirectional moving member 50a and 50b can connect to driven sprockets 45a on one end and on the opposite end idler sprockets.

At least one chain tightener assembly 47a and 47b can be mounted on each end of the load bearing bidirectional moving members. Each chain tightener assembly 47a and 47b can be used for tightening the moving loop of chain shown in this embodiment.

The chain can have a different form which is not a loop in one or more embodiments.

The chain can be replaced with load bearing bidirectional moving members selected from the group: belts, rolling platforms, sliding skids, walking floors, or combinations thereof. The connected moveable load supporting conveying members can be adapted to support and move a load up to 10 tons without deforming.

The chain tighter assembly can be attached within each strand weldment in this embodiment.

The drive assembly 38 can be made up of a hydraulic motor 30 such as a Eaton brand model 101-1013-009 model number variable speed hydraulic motor. A gear box 34 can be connected to the hydraulic motor 30.

A shaft 35, which can be about 102 inches long and about 2 and $3/16^{th}$ inches in diameter, can be used between the gear box 34 and a bearing. Two bearings can be used in the drive assembly, bearing 37a can be viewed in this Figure. Bearings engage each strand weldment 13a and 13b.

The shaft 35 can be rotated by the hydraulic motor 30. The hydraulic motor 30 can first rotate the gear box 34 which then rotates the shaft 35 supported by the bearings 37a for moving each load bearing bidirectional moving members 50a, 50b, simultaneously, in tandem. The shaft can be a rod of solid steel.

A pair of rear guards 74a and 74b can be used to protect users in the facility from bodily harm and reduce workmen compensation claims to a facility providing a safer, friendly work environment.

In embodiments wherein the controllable hydraulic components can include a rack and pinion, a linear actuator, a chain and gear box, a helical gear assembly to pivot the stacking fork assembly without using the hydraulic cylinder. These components can optionally be used with another hydraulic motor.

Although the automatic stacker 85 can be operated in this embodiment with a hydraulic motor, the control assembly 67 can be connected to the power supply for receiving electricity, such as solar power or wind power, power from a generator or another electric power source.

Also in this view is the stacking fork assembly 29 showing a plurality of forks connected together in parallel.

The stacking fork assembly 29 can be pivoted by hydraulic cylinders 49a and 49b which are shown mounted to a hydraulic cylinder mount 17b.

The stacking fork assembly 29 pivots on bearings 2a and 2b, as the hydraulic cylinders extend and retract, pivoting the stacking fork assembly to a receive position, as the hydraulic cylinders extend and to a stacking position as the hydraulic cylinders retract.

FIG. 13B shows a remote control 98 which can be connected to the control assembly 67 by a network 99 allowing a user to control the drive assembly from a control room or remote location.

The network 99 can be a local area network, the World Wide Web, or a cellular network.

The remote control 98 can be in communication with a remote control power supply 116. The remote control power supply 116 can be solar rechargeable batteries.

The remote control 98 can also include a processor 115. The processor 115 can be communication with a remote control data storage 117.

The remote control data storage 117 can include computer instructions to view operation of a plurality of automatic stackers 114. The computer instructions to view operation of a plurality of automatic stackers 114 can enable a person remote from the automatic stackers to view the operation of one or more of the automatic stackers. For example, a person remote from the automatic stackers can view a first automatic stacker and second automatic stacker simultaneously.

The computer instructions to view operation of a plurality of automatic stackers 114 can also form an executive dashboard. The executive dashboard is discussed in more detail in FIG. 20.

The use of the remote control 98 connected to each automatic stacker allows for accurate counting to monitor multiple customer orders for compliance at regular and instantaneous intervals to check on production problems and keep a facility running faster, better, cheaper, and in compliance with customer needs.

In another embodiment, the remote control 98 can be wired to the control assembly 67 with a wire 77 to allow an operator to stand apart from the automatic stacker to initiate the operation of the automatic stacker, which then runs stacking operations, automatically.

The remote control data storage 117 can include computer instructions to cause the automatic stacker control assembly to send out a bundle or "part pack" 136.

Figure 14:
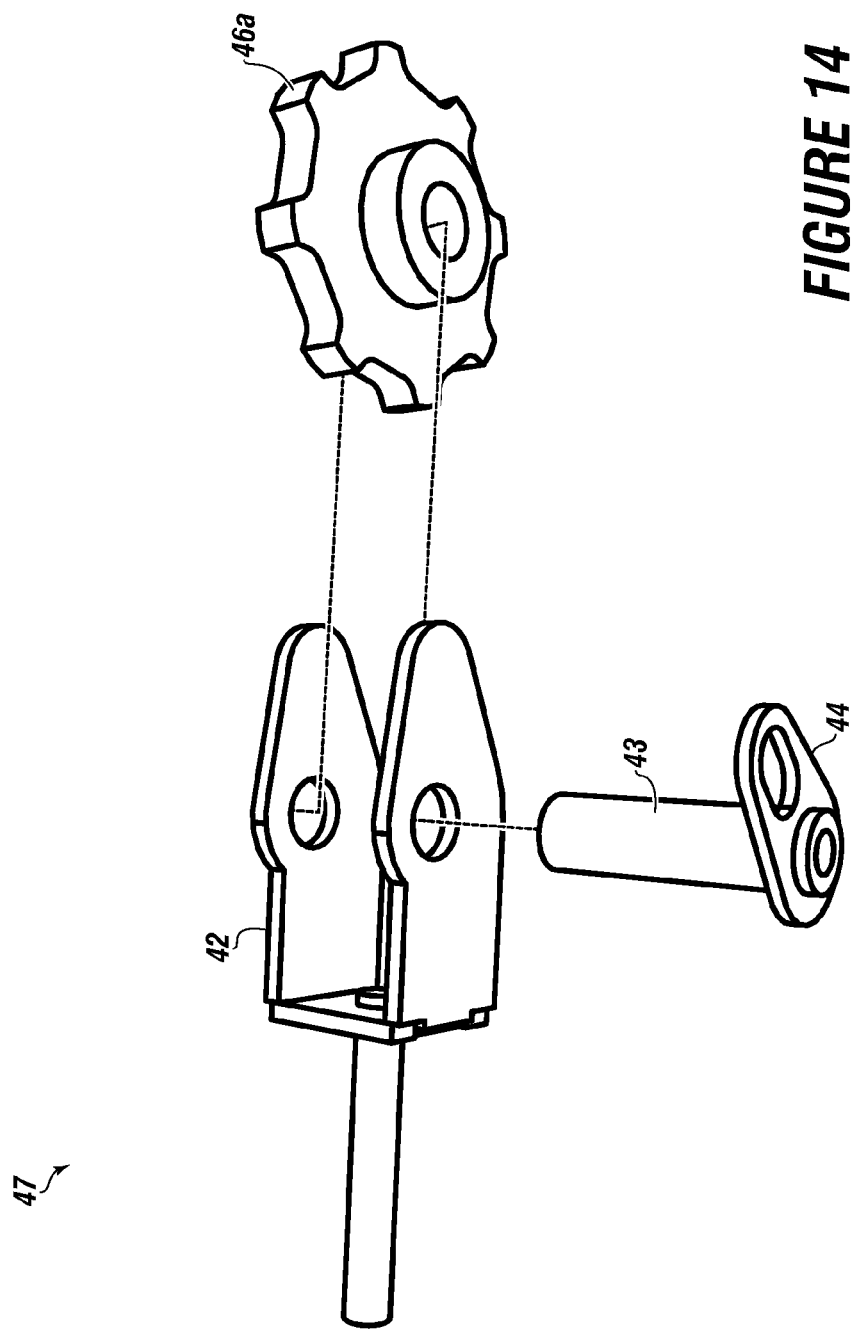
FIG. 14 depicts a chain tightener assembly usable with this method.

FIG. 14 depicts an exploded view of the chain tightener assembly 47 usable with each load bearing bidirectional moving member of the automatic stacker.

The chain tightener assembly can include a chain tightener weldment 42 which can support a pin 43.

An idler sprocket 46a rotates around the pin 43 which can be held into the chain tightener weldment with a tab 44.

Figure 15:
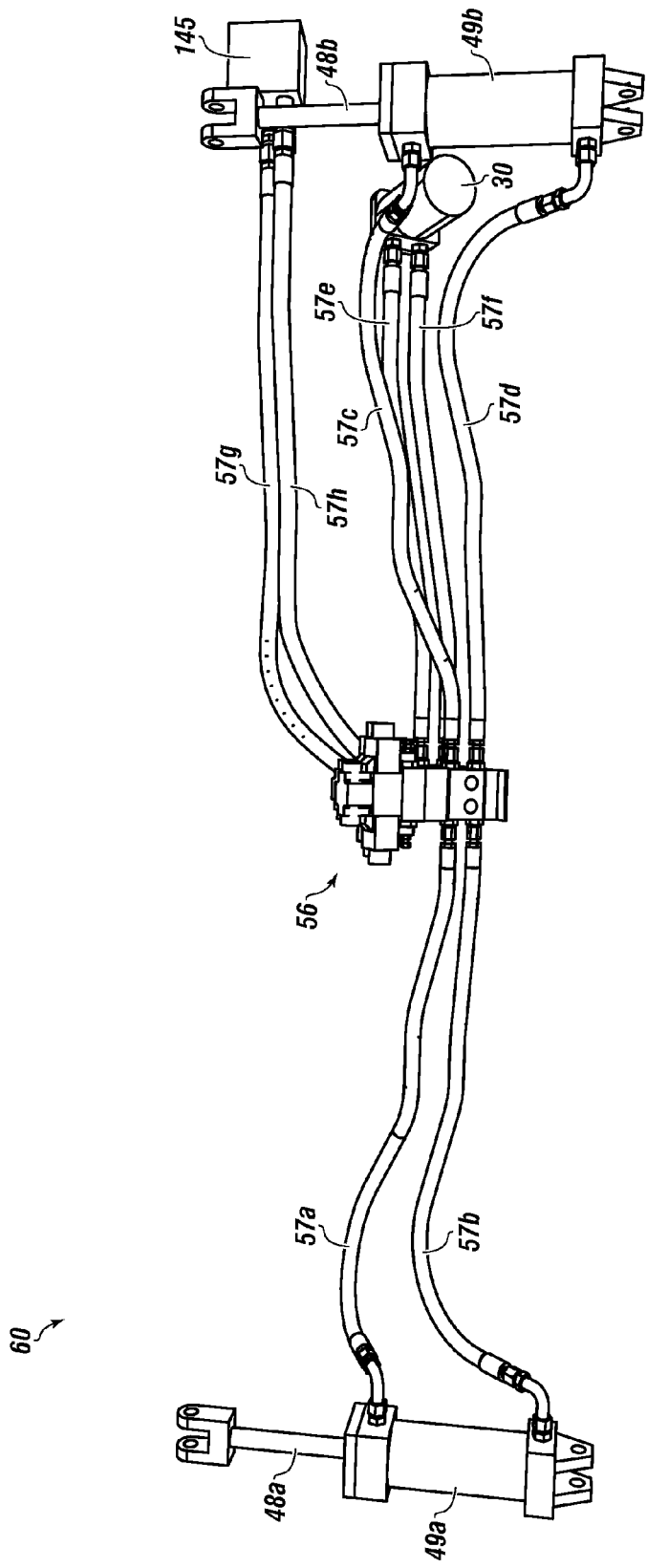
FIG. 15 depicts a detail of the hydraulic components used in this method.

FIG. 15 depicts a detail of the controllable hydraulic components 60 used to operate the automatic stacker.

Controllable hydraulic components 60 rotate the stacking fork assembly from a receiving position shown in FIG. 2 to a vertical stacking position shown in FIG. 3 when the full tier sensor has provided signals to the control assembly.

Controllable hydraulic components 60 in this embodiment can be mounted to the main frame weldment and in communication with a hydraulic fluid supply 145.

The controllable hydraulic components 60 include a hydraulic valve assembly 56 such as a Duplomatic model D53-S3/11N-D24K1 valve; a hydraulic motor 30 such as an Eaton 101-1013-009 motor in communication with the hydraulic valve assembly 56. A pair of hydraulic cylinders 49a and 49b can each have a rod 48a and 48b. Each hydraulic cylinder can be fluidly connected to the hydraulic valve assembly 56 with hydraulic hoses. TRD Illinois manufactures usable hydraulic cylinders able to handle pressure from about 800 to about 3000 psi.

Hydraulic hoses 57a and 57b are "in an out" hydraulic fluid lines for the first hydraulic cylinder 49a.

Hoses 57c and 57d are "in and out" hydraulic fluid lines for the second hydraulic cylinder 49a.

Hydraulic hoses 57e and 57f are "in and out" hydraulic fluid lines for the hydraulic motor 30.

Hydraulic hoses 57g and 57h are pressure and tank hydraulic fluid lines for providing the fluid to and from the external fluid supply.

Figure 16:
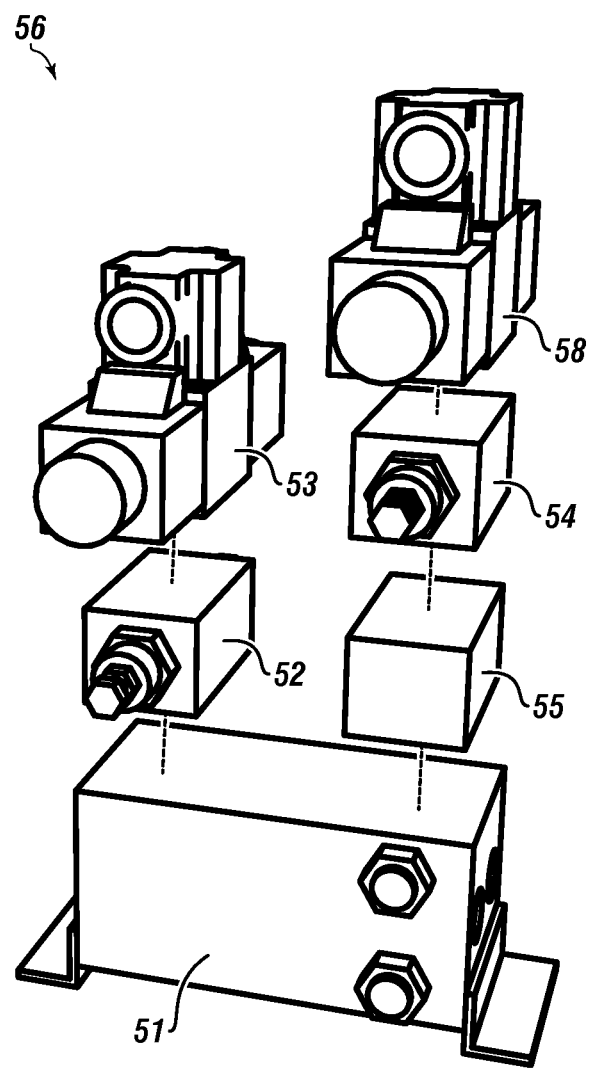
FIG. 16 depicts an exploded view of the hydraulic manifold valve assembly usable in this method.

FIG. 16 depicts an exploded view of the hydraulic valve assembly 56 of the automatic stacker.

The hydraulic valve assembly 56 can include a hydraulic manifold 51, such as a D03 standard flow Parallel Circuit Manifold made by Daman of Indiana, a flow control module 52, such as a MERS-D/50 made by Duplomatic for a hydraulic motor connected to the hydraulic manifold; a first solenoid directional valve 53, such as a DS3-53/11N-D24K1 made by Duplomatic, for the hydraulic motor; a check valve 55, such as a MVPP-D/50 made by Duplomatic for the pair of hydraulic cylinders connected to the hydraulic manifold 51; a flow control module 54, such as a MERS-GD/50 made by Duplomatic fluidly communicates with the check valve 55; and a second solenoid directional valve 58, which can be identical to the first solenoid valve for the pair of hydraulic cylinders fluidly engages the flow control module 54.

Figure 17:
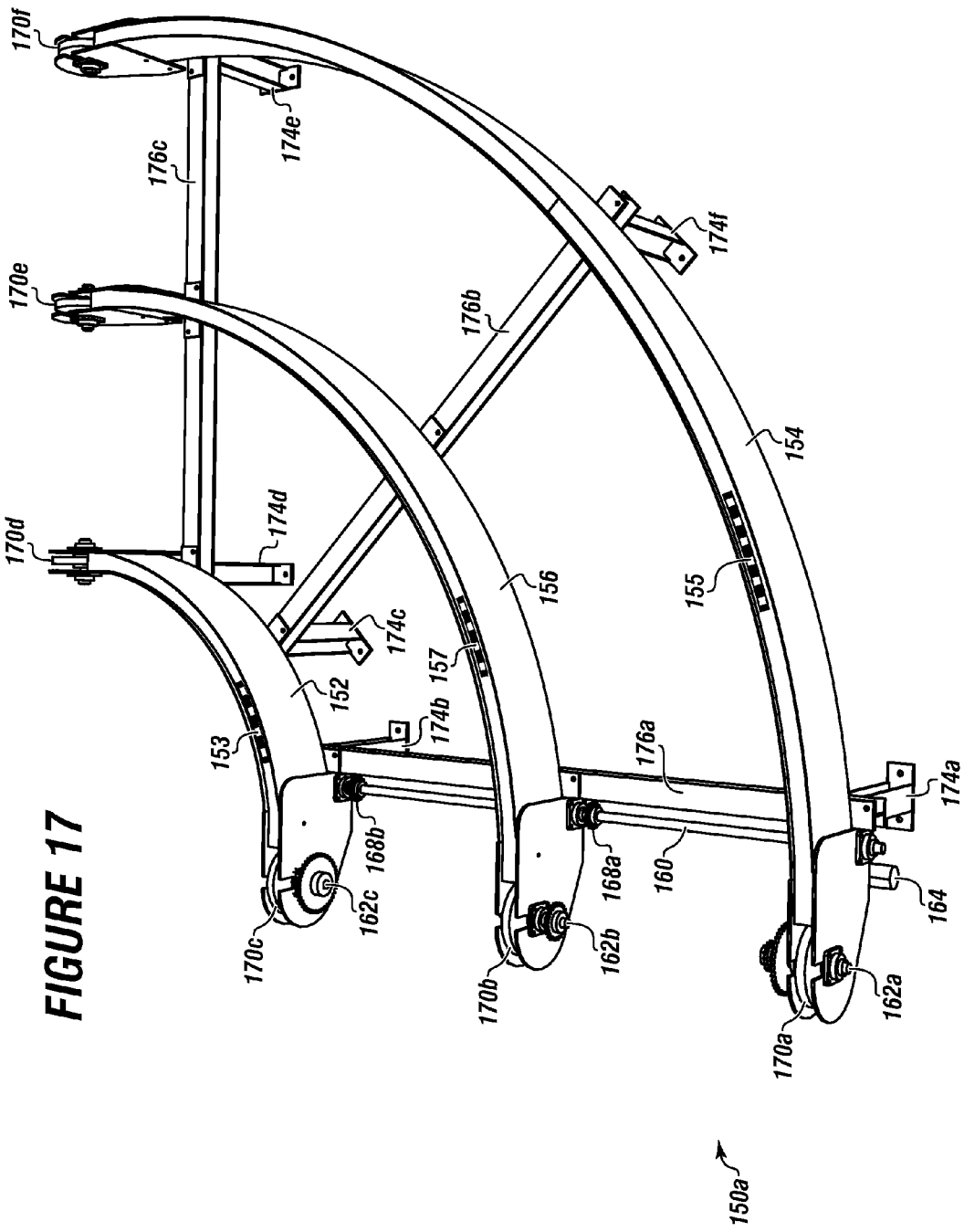
FIG. 17 depicts a ninety degree live deck usable with this method.

FIG. 17 depicts a ninety degree live deck 150a usable with the automatic stacker and operable by the control assembly of the automatic stacker.

The ninety degree live deck 150a can include an outside strand 154, an inside stand 152 and a center strand 156 between the outside strand and the inside strand, positioned equidistantly between the strands. Each strand provides a ninety degree curve allowing timbers or beams to be moved automatically from the live roll case to the automatic stacker.

The strands support a plurality of short drive shafts 162a, 162b, and 162c. A long drive shaft 160 can also be used to operate the various chains.

The strands support various sprockets which engage chains for moving the loads on their decks.

Sprockets 168a and 168b can be chain sprockets. The sprockets 168a and 168b can support roller chain.

Sprockets 170a, 170b, 170c, 170d, 170e, and 170f can be polyflex chain sprockets for polyflex chain.

The strands can be positioned on legs 174a, 174b, 174c, 174d, 174e, and 174f and connected to each other using support members 176a, 176b, and 176c.

The inside strand 152 having a ninety degree curve, with an inside chain 153 mounted in the inside strand. The inside chain can have a first length such as from about 15 feet to about 25 feet. The inside chain can be made of polymer with self-lubricating components that can be from about 1 inch to about 5 inches apart.

The outside strand 154 having a ninety degree curve; with an outside chain 155 in the outside strand. The outside chain 155 has a second length longer than the first length, such as from about 35 to about 50 feet. The outside chain can be made of the same material as the inside chain, with links disposed from about 1 inch to about 5 inches apart.

The center strand 156 can have a center chain 157 the center strand having a third length between the first and second lengths, such as from about 25 feet to about 35 feet. The center chain can be made of the same material as the inside and outside chains.

A drive assembly connects to the chains of the strands. The drive assembly can be connected interchangeably on the ninety degree live deck as a right hand drive assembly or a left hand drive assembly (not shown) on opposite ends of the strands.

A deck hydraulic motor 164 can be connected to the long drive shaft 160 and the short drive shafts 162a and 162b. The deck hydraulic motor 164 is in communication with a hydraulic assembly which can be a remote hydraulic motor or the hydraulic motor of the automatic stacker.

Figure 18:
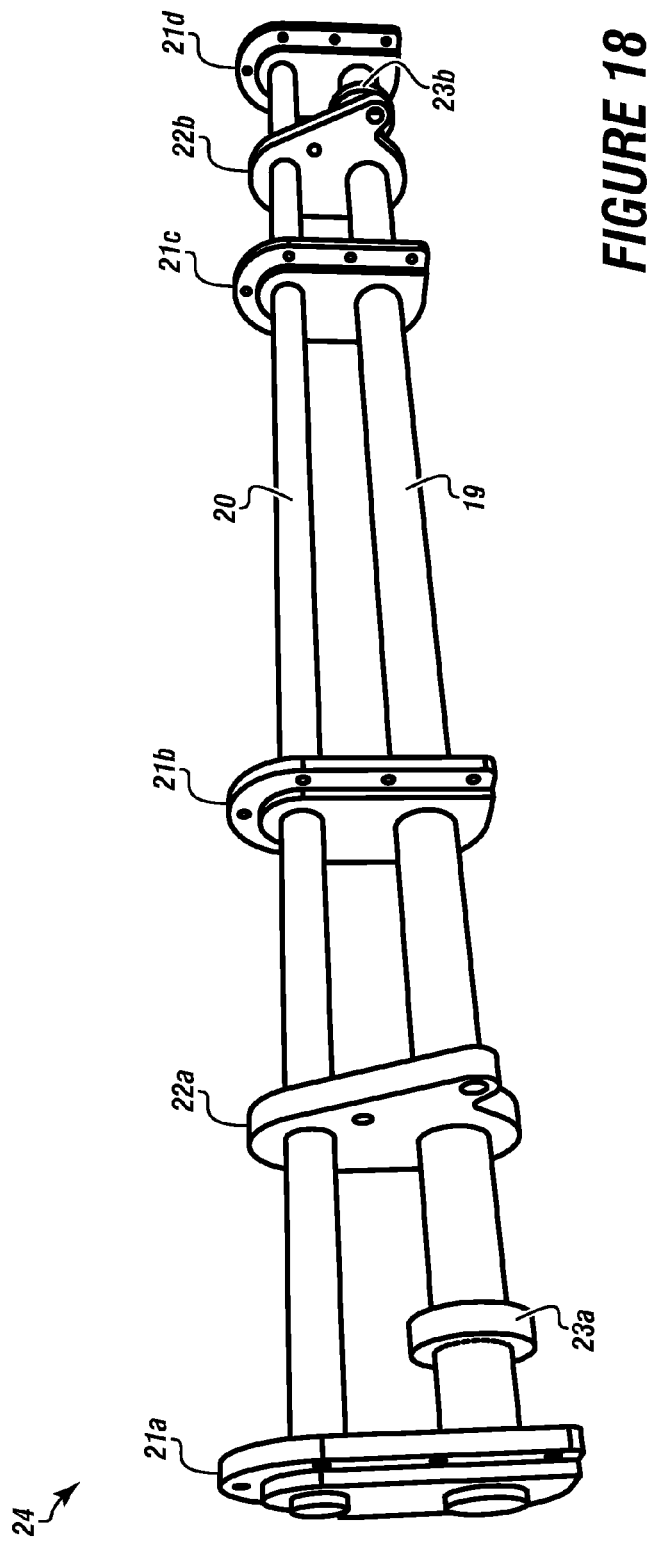
FIG. 18 depicts a stacking fork frame weldment usable in this method.

FIG. 18 depicts a stacking fork frame weldment 24 usable in an embodiment of the automatic stacker.

Rod mounts 22a and 22b secure to the shaft 19 for connecting with the rods (shown in FIG. 15).

Collars 23a and 23b can be used around the shaft 19 for preventing and controlling longitudinal movement of the shaft.

A plurality of fork mounts 21a, 21b, 21c, and 21d are shown optionally mounted to a tubular 20 in parallel with the shaft 19. However, in other embodiments, the fork mounts can be installed on the shaft 19 directly without using the tubular 20.

Figure 19:
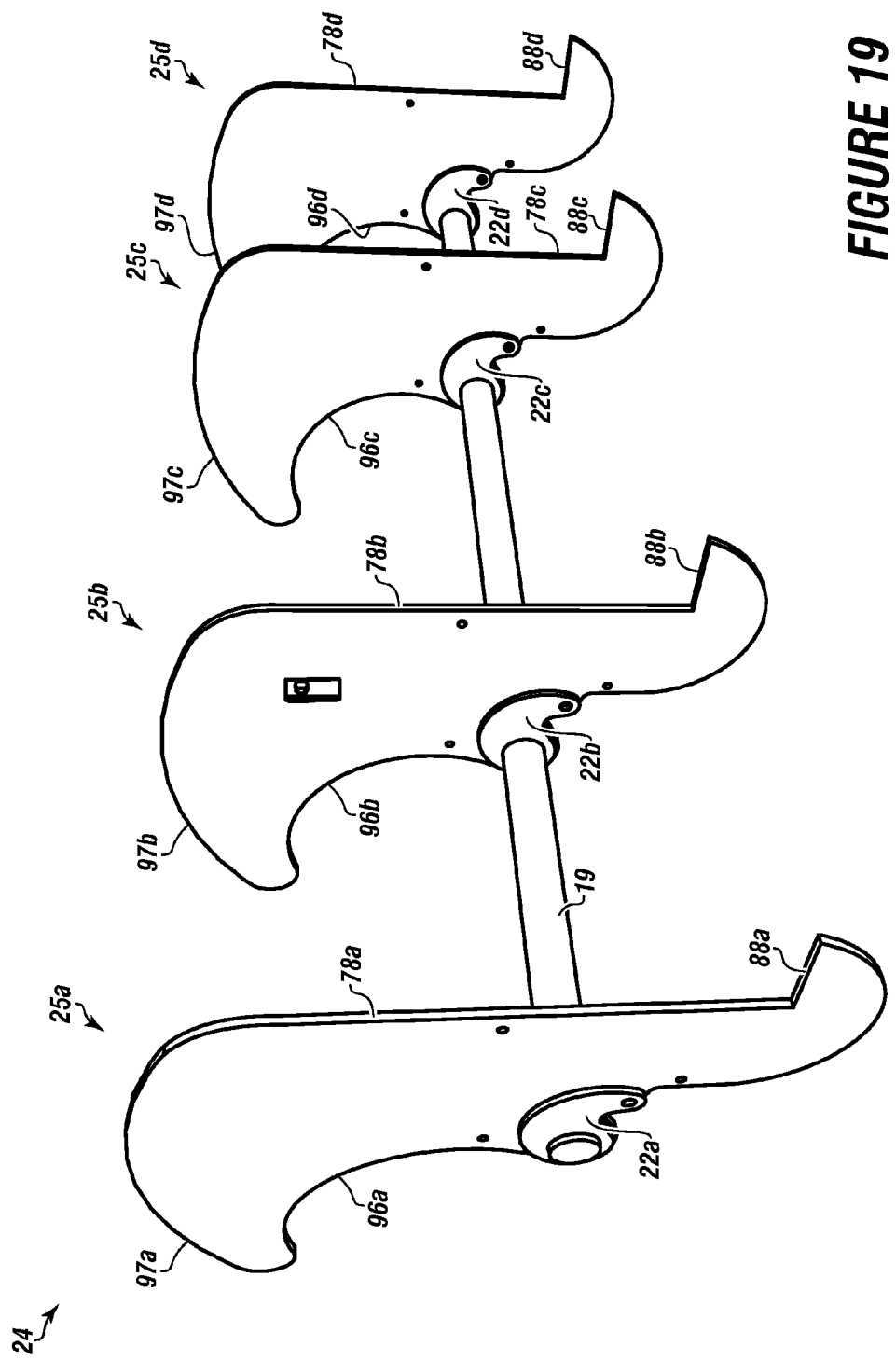
FIG. 19 depicts a stacking fork assembly usable with this method.

FIG. 19 depicts a second embodiment of the stacking fork frame assembly 24 usable with the automatic stacker.

The plurality of forks 25a-25d are shown in this embodiment welded directly to the shaft 19.

Each fork can have a beam stop 97a-97d, a clearance curve 96a-96d, and an accumulator edge 78a-78d.

Fork 25a has accumulation stop 88a, fork 25b has accumulation stop 88b, fork 25c has accumulation stop 88c, and fork 25d has accumulation stop 88d. Also shown are rod mounts 22a-22d.

In another embodiment, the accumulating edge can connect to the accumulation stop at an angle ranging from about 80 degrees to about 100 degrees. The accumulation stop prevents beam or cut timber or large rectangular items from sliding off individual forks.

With the need to conserve energy usage, this uniquely controlled and automated assembly will save significant energy costs in saw mills and other manufacturing and material handling facilities.

Figure 20:
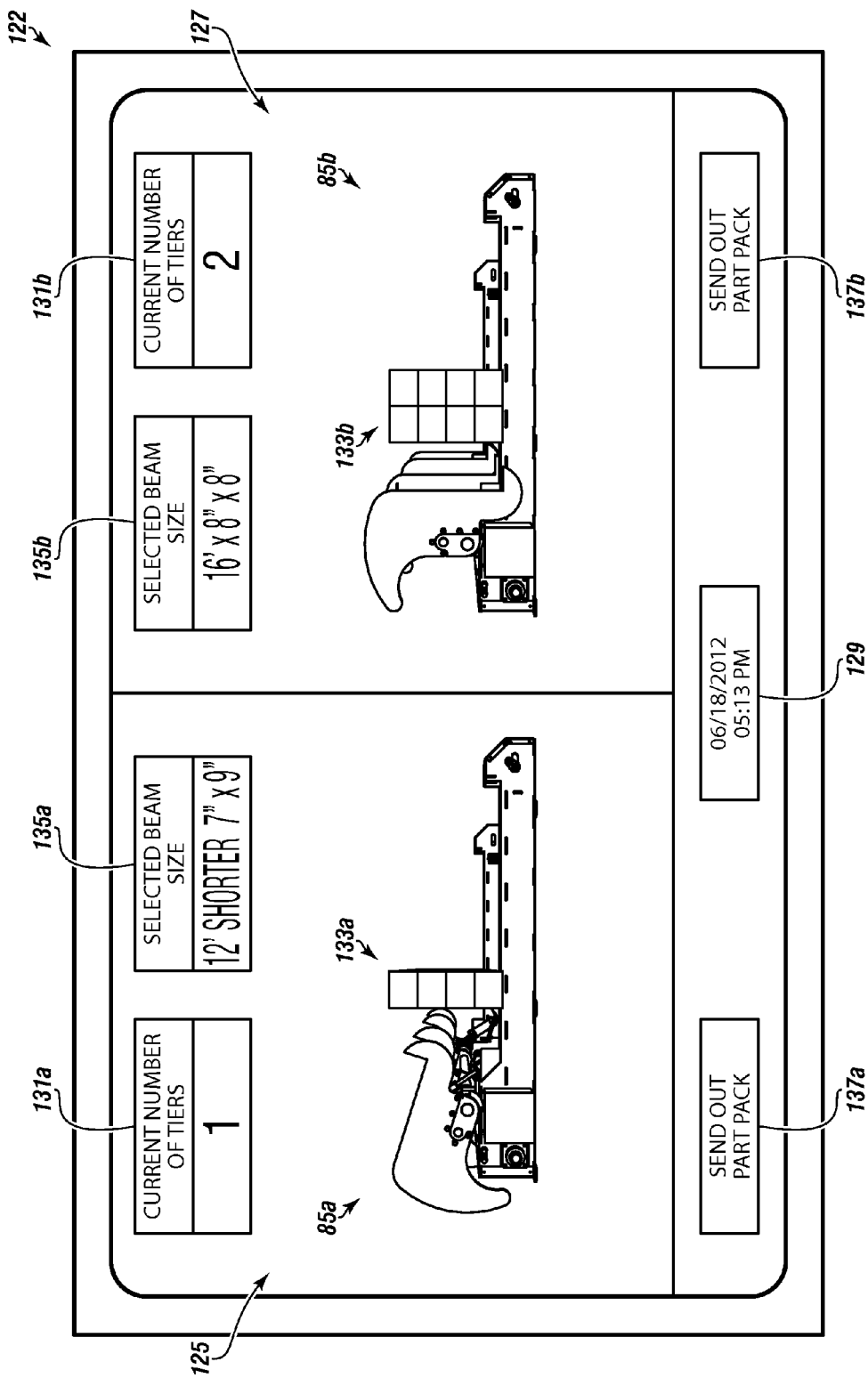
FIG. 20 depicts an executive dashboard usable in the method.

FIG. 20 shows a touch screen display of an executive dashboard usable herein.

The executive dashboard provides stacker information in real time, 24 hours a day, 7 days a week.

The executive dashboard 122 shows a first automatic stacker status 125 as a visual image with the forks oriented in their current real time position and a second automatic stacker status 127 as a visual image with the forks of the second stacker oriented in their current real time position.

The executive dashboard 122 tracks the actual time, day, and date 129 for viewing these two simultaneous images.

In one or more embodiments, the executive dashboard can be illuminated when each automatic stacker is on.

The executive dashboard can provide information including, but not limited to, a quantity of tiers in a tracking box 131a and 131b are shown In FIG. 20, the first automatic stacker 85a is shown with a single tier of beams 133a loaded and the second automatic stacker 85b is shown with a bundle 133b loaded.

The executive dashboard 122 can also portray a selected beam size box 135a and 135b such as the size of a railroad tie. The size can be selected from a drop down menu of sizes of beams.

A commend box 137a and 137b can be on the executive dashboard 122 allowing a remote user to transmit a command using the remote control to send out a bundle or "part pack".

The same computer instructions can be used to compute a rate of completion for job orders, providing information on time and day when certain jobs will be completed based on the automated operation of the stacker for the best possible customer compliance.

FIG. 21 depicts the sequence of steps of the method.

Step 500 can include automatically sliding in sequence a plurality of beams from the moving production line automatically onto a plurality of forks in a receiving position at a first angle of inclination from a plane of the moving production line.

Step 502 can include pivoting the forks to a stacking position when the beams on the forks reach a preset number of beams automatically, forming a tier of beams.

Step 504 can include automatically placing the tier of beams on load bearing bidirectional moving members.

Step 506 can include automatically moving the tier away from the forks with the load bearing bidirectional moving members.

Step 508 can include creating another tier.

Step 510 can include backing up any tier on the load bearing bidirectional moving members towards the forks to contact an additional tier placed on the load bearing bidirectional moving members.

Step 512 can include moving contacted tiers away from the forks.

Step 514 can include repeating creation of tiers and positioning on the load bearing bidirectional moving members until a bundle of tiers is formed, wherein the bundle is a preset number of tiers.

Step 516 can include moving the bundle away from the forks.

While these embodiments have been described with emphasis on the embodiments, it should be understood that within the scope of the appended claims, the embodiments might be practiced other than as specifically described herein.

What is claimed is:

1. An automatic method for stacking beams or cut timber from a moving production line, wherein the method comprises:
   a. sliding in sequence a plurality of beams or cut timber from the moving production line to a stacker, wherein the beams or cut timbers slide in sequence onto a plurality of forks, each fork having a beam stop;
   b. orienting the forks at a first angle of inclination from a plane of the moving production line enabling simultaneous gravity feed of a first beam or a cut timber onto the plurality of forks simultaneously and stopping the first beam or the cut timber using a plurality of beam stops and wherein the angle of inclination is from 1 degree to 20 degrees;
   c. sensing when the plurality of beams or cut timbers reaches a preset quantity of beams or cut timber using a full tier sensor mounted to one of the plurality of forks;
   d. using computer instructions in data storage of a programmable controller connected to the full tier sensor to actuate hydraulic components comprising at least one hydraulic cylinder to rotate the stacking fork assembly from a receiving position to a stacking position when the preset quantity of cut timber or cut beams is achieved;
   e. forming a first tier of cut timber or beams while rotating the stacking fork assembly;
   f. placing the first tier on a plurality of load bearing bidirectional moving members while actuating a stacking position sensor and computer instructions to count tiers placed on the plurality of load bearing bidirectional moving members and save the count in the data storage;
   g. using computer instructions to actuate the hydraulic components to move the load bearing bidirectional moving members carrying the first tier to a predetermined first distance away from the forks and when both the full tier sensor and the stacking position sensor are simultaneously activated;
   h. using computer instructions to actuate the hydraulic components to rotate the stacking fork assembly back to the receiving position of the forks when the full tier sensor deactivates;
   i. using a receiving position sensor to determine when the forks are in the receiving position and activating computer instructions to deactivate the hydraulic components;
   j. repeating step a, b, and c to form a second tier of cut timbers or beams while rotating the stacking fork assembly;
   k. placing the formed second tier on the load bearing bidirectional moving members proximate to the first tier while actuating the stacking position sensor;
   l. using computer instructions to actuate the hydraulic components to move the load bearing bidirectional moving members towards the forks to a predetermined second distance when a sum of counted tiers exceeds one, while simultaneously contacting the first tier with the second tier,
   m. activating computer instructions simultaneously when using computer instructions to move the counted tiers to track a predetermined amount of time;
   n. upon passage of the predetermine amount of time, activating computer instructions to actuate the hydraulic components to move the load bearing bidirectional moving members away from the forks to a predetermined third distance while the first tier remains in contact with the second tier;
   o. repeating steps a, b, and c forming additional identical tiers of cut timber or beams while rotating the stacking fork assembly;
   p. placing the additional identical tiers on the load bearing bidirectional moving members proximate to preexisting tiers while actuating the stacking position sensor;
   q. using computer instructions to actuate the hydraulic components to move the load bearing bidirectional moving members towards the forks to a predetermined second distance when the sum of counted tiers exceeds one, while contacting the additional identical tiers with the preexisting tiers;
   r. simultaneously activating computer instructions to track a predetermined amount of time when computer instructions actuate; and
   s. upon passage of the predetermine amount of time, activating computer instructions to actuate the hydraulic components to move the load bearing bidirectional moving members away from the forks to a predetermined third distance while one of the additional identical tiers connects with one of the preexisting tiers.

2. The automatic method of claim 1, wherein the moving production platform comprises a roll case with pull off chain, a plurality of moving chains, a plurality of skate rollers connected in series, a plurality moving belts, or a ninety degree live deck.

3. The automatic method of claim 1, wherein programmable controller is a processor, a laptop, and Ipad, or cellular device, connected to a network having at least one processor for controlling the automatic stacking method from a remote location.

4. The automatic method of claim 1, wherein the load bearing bidirectional moving members are chain, a plurality of connected rollers, at least one moveable skids, or combinations thereof.

5. The automatic method of claim 1, further uses computer instructions to count numbers of tiers to compare the counted number of tiers to a predetermined quantity of tiers, and when the predetermined quantity of tiers is reached, actuating the hydraulic components to move the load bearing bidirectional moving members with the predetermined quantity of tiers to a predetermined fourth distance away from the forks.

6. The method of claim 1, further comprising using as the load bearing bidirectional moving members loops of connected moveable load supporting conveying chains adapted to support and move a load up to 10 tons.

7. The method of claim 1, further comprising using a plurality of stack fork mounts affixed to the shaft, wherein each stack fork mount engages one of the plurality of forks.

8. The method of claim 1, further comprising using with the stacking fork assembly, a tubular mounted in parallel with the shaft and connected to the rod mount.

9. The method of claim 1, wherein each fork has a clearance edge having a general C-shape.

10. The method of claim 9, further comprising using a plurality of stack fork mounts affixed to the tubular wherein each stack fork mount engages one of the plurality of forks.

11. The method of claim 1, wherein each fork has a curved beam stop edge forming a radius from a pivot point, preventing the plurality of beams or cut timber from the moving production from moving while the plurality of forks pivots.

12. The method of claim 1, wherein each fork has an accumulating edge, and wherein the accumulating edge engages the beam stop at an angle ranging from 80 degrees to 100 degrees.

13. The method of claim 1, further comprising using a remote control for communicating via a network or a wire to the control system of the stacker from a location remote to the stacker.

14. The method of claim 1, further comprising using an end of strand weldment sensor to detect a presence of the predetermined quantity of tiers and communicates with computer instructions to stop the movement of the load bearing bidirectional movement members.

15. The method of claim 1, further comprising using an end of strand weldment sensor mounted to a main frame weldment to detect a presence of the predetermined quantity of tiers and computer instructions connected to the end of strand weldment sensor to halt operation of the method when the predetermined quantity of tiers is detected.

16. The method of claim 1, further comprising using a deck drive assembly to drive the load bearing bidirectional moving members, wherein the deck drive assembly comprises:
 a. a gear box connected to the hydraulic motor;
 b. a shaft projecting from the gear box;
 c. a first sprocket connected to a first end of the shaft and a second sprocket connected to a second end of the shaft; and
 d. a bearing engages between each sprocket and a main frame weldment.

17. The method of claim 1 further comprising calibrating the full tier sensor to produce a signal when one of the full tiers is within a predetermined sensor range of the sensor and to deactivate when one of the full tiers is outside the predetermined sensor range.

18. The method of claim 1, further comprising using hydraulic components that comprise a manifold valve assembly for operating at least one hydraulic cylinder wherein the manifold valve assembly further comprises:
 a. a hydraulic manifold;
 b. a flow control module for a hydraulic motor connected to the hydraulic manifold;
 c. a solenoid directional valve for the hydraulic motor;
 d. a check valve for the at least one hydraulic cylinder connected to the hydraulic manifold;
 e. a flow control module for the at least one hydraulic cylinder fluidly communicates with check valve; and
 f. a solenoid directional valve for the at least one hydraulic cylinder fluidly engages the flow control module.

\* \* \* \* \*